United States Patent [19]
Yamamoto et al.

[11] Patent Number: 6,095,203
[45] Date of Patent: Aug. 1, 2000

[54] METHOD AND APPARATUS FOR INJECTING LIQUID CRYSTAL MATERIAL

[75] Inventors: Yuichi Yamamoto, Tsu; Akira Ohnishi, Kashihara; Yasuyuki Matsuoka, Nara; Masaru Yamaguchi, Uji, all of Japan

[73] Assignee: Sharp Kabushiki Kaisha, Osaka, Japan

[21] Appl. No.: 08/927,966

[22] Filed: Sep. 11, 1997

[30] Foreign Application Priority Data

Sep. 12, 1996 [JP] Japan .................................. 8-241466
Nov. 29, 1996 [JP] Japan .................................. 8-318405

[51] Int. Cl.$^7$ ...................................................... G02F 1/00
[52] U.S. Cl. .................................. 141/59; 141/7; 141/65; 141/67; 349/189
[58] Field of Search .............................. 141/5, 7, 59, 65, 141/67; 349/187, 189

[56] References Cited

U.S. PATENT DOCUMENTS 5,819,824 10/1998 Sugiura ................................. 141/383

FOREIGN PATENT DOCUMENTS

| 49-79543 | 8/1974 | Japan . |
|---|---|---|
| 49-130756 | 12/1974 | Japan . |
| 60-230636 | 11/1985 | Japan . |
| 63-26620 | 2/1988 | Japan . |
| 5-297386 | 11/1993 | Japan . |

OTHER PUBLICATIONS

Liquid Crystal Device Handbook, pp. 536–539, 1989.

*Primary Examiner*—J. Casimer Jacyna

[57] ABSTRACT

A method for injecting a liquid crystal material into a liquid crystal panel which is provided with a liquid crystal injection port and an evacuation port is provided. The method includes the steps of: evacuating the liquid crystal panel; and after the evacuation step, injecting the liquid crystal material into the liquid crystal panel through the liquid crystal injection port with the liquid crystal material being pressurized while evacuating the liquid crystal panel.

12 Claims, 17 Drawing Sheets

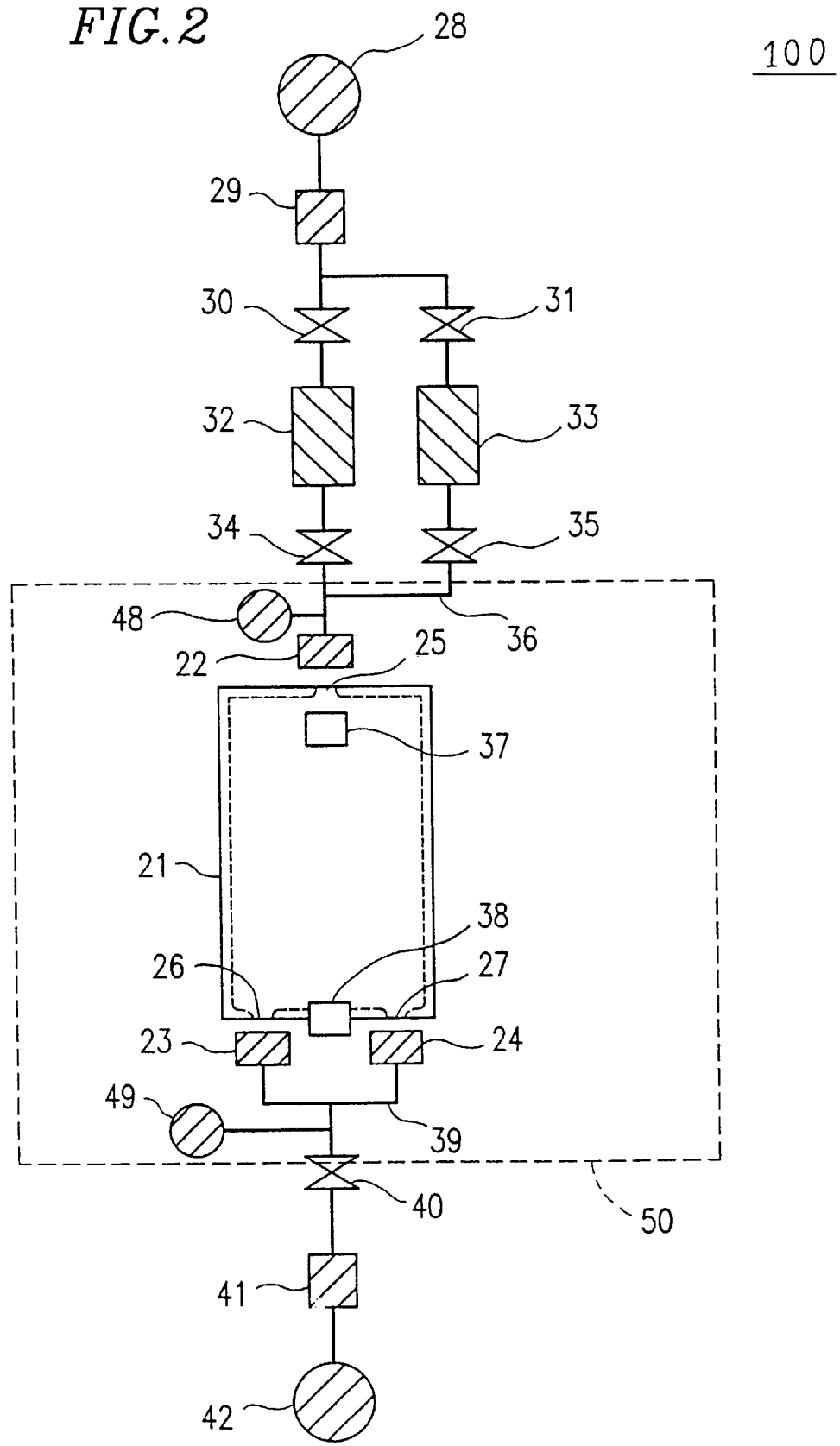

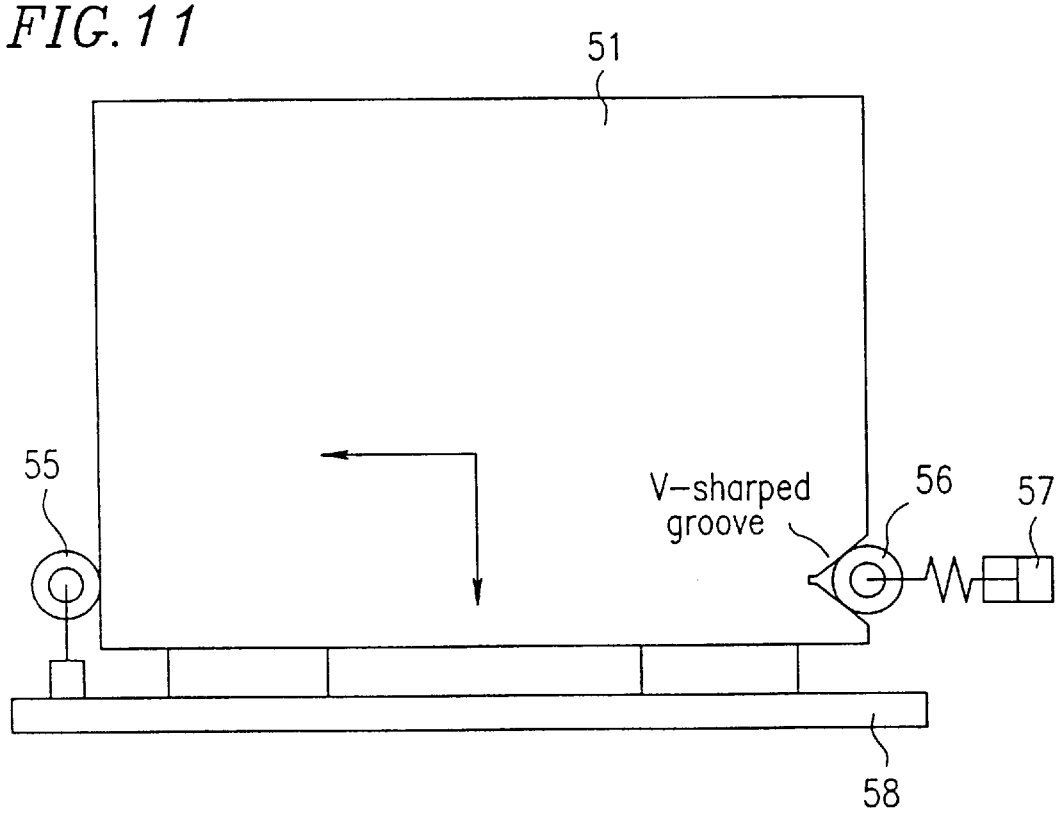

CONVENTIONAL ART

CONVENTIONAL ART

METHOD AND APPARATUS FOR INJECTING LIQUID CRYSTAL MATERIAL

BACKGROUND OF THE INVENTION

1. Field of the Invention

The present invention relates to a method and apparatus for injecting a liquid crystal material into a liquid crystal panel of a liquid crystal display device. In particular, the present invention relates to a method for injecting a liquid crystal material into a liquid crystal panel with improved efficiency, increased injection rate, and which does not generate bubbles or displacement of spacer beads, and to a liquid crystal injection apparatus useful for this purpose.

2. Description of the Related Art

As shown in FIG. 20, a liquid crystal display device typically includes a pair of glass plates 8 which are attached to each other with an adhesive layer 9 applied therebetween along the periphery thereof. Moreover, spacer beads (not shown) are applied uniformly between the glass plates 8. The spacer beads and the adhesive layer 9 form a liquid crystal injection space 11 having a thickness (about 1 $\mu$m to 5 $\mu$m) which corresponds to the total thickness of the spacer beads and the adhesive layer 9. Then, a liquid crystal material is injected into the liquid crystal injection space 11 through liquid crystal injection ports 10 formed in the adhesive layer 9.

Hereinafter, conventional examples of methods for injecting a liquid crystal material will be described. In the following description, the term "liquid crystal panel" refers to a panel whose liquid crystal injection space is not filled with a liquid crystal material, i.e., the panel without a liquid crystal material filling between the glass plates 8 in FIG. 20.

Conventional Example 1

A liquid crystal injection apparatus is used for injecting a liquid crystal material into a liquid crystal panel 13. FIGS. 21 and 22 are views illustrating an example of such a liquid crystal injection apparatus. A liquid crystal injection apparatus 15 includes a sealed chamber 1 which accommodates both the liquid crystal panel 13 and the liquid crystal material 14, and pressure adjustment means 2 for adjusting the pressure within the sealed chamber 1. The pressure adjustment means 2 includes two conduits 3 and 4 for communication between the inside and outside of the sealed chamber 1, valves 5 and 6 provided halfway along the conduits 3 and 4, respectively, and a vacuum pump 7 provided at one end of one conduit 3. The liquid crystal panel 13 is supported by a support mechanism (not shown) so as to be movable in the vertical direction. The liquid crystal material 14 is stored in a tray 12 which is provided on the bottom surface of the sealed chamber 1.

Using the liquid crystal injection apparatus 15 so configured, the liquid crystal material 14 is injected into the liquid crystal panel 13 as follows Japanese Laid-Open Publication No. 49-130756, Japanese Laid Open Publication No. 49-79453, Japanese Laid-open Publication No. 60-230636, Japanese Laid-open Publication No. 63-26620, and "Liquid Crystal Device Handbook," Nikkan Kogyo Shinbunsha, Sep. 29, 1989).

(1) First, as shown in FIG. 21, the liquid crystal panel 13 is located so as not to be in contact with the liquid crystal material 14.

(2) The valve 5 is opened while the valve 6 is closed. The vacuum pump 7 is then actuated so as to evacuate the sealed chamber 1.

(3) Once a predetermined degree of vacuum is achieved, the liquid crystal panel 13 is lowered by the support mechanism (not shown) so that the liquid crystal injection ports 10 provided along the lower side of the liquid crystal panel 13 are dipped in the liquid crystal material 14, as shown in FIG. 22.

(4) Thereafter, the valve 5 is closed while the valve 6 is opened, thus introducing the ambient air into the sealed chamber 1. Then, the ambient pressure is applied onto the surface of the liquid crystal material 14, so that the liquid crystal material 14 is pushed up and filled into the liquid crystal injection space 11, as indicated by an arrow in the figure. Needless to say, the capillary phenomenon also contributes a filling force to the filling process.

Conventional Example 2

FIG. 23 is a view illustrating another conventional example of the method for injecting a liquid crystal material into a liquid crystal panel (Japanese Laid-open Publication No. 5-297386). Herein, an injection port 81 and an evacuation port 82 are formed in the liquid crystal panel 13'. Injection of the liquid crystal material 14 into such a liquid crystal panel 13' is performed as follows.

(1) First, a pipe 83 is connected to the injection port 81. The tip of the pipe 83 is temporarily sealed with a sealing cap 84 having a good elasticity.

(2) Next, the liquid crystal panel 13' is evacuated through a pipe 85 connected to the evacuation port 82.

(3) Subsequently, a liquid crystal material is supplied around the pipe 83 on the sealing cap 84.

(4) The tip of the pipe 83 is then gently and slightly lifted and spaced apart from the sealing cap 84 so that no air is introduced into the pipe 83, and is held so that the airtightness at the tip of the pipe 83 is not broken.

(5) The injection display device 13' is continuously evacuated through the evacuation port 82 so as to fill injection display device 13' with the liquid crystal material 14.

However, the following problems are associated with the Conventional Examples 1 and 2.

Problems Associated with Conventional Example 1

In the liquid crystal injection method of Conventional Example 1, as the sealed chamber 1 is depressurized, a large amount of the liquid crystal material 14 in the tray 12 is evaporated and evacuated from the sealed chamber 1 along with the evacuated air. Moreover, during the injection of the liquid crystal material 14, the side of the liquid crystal panel 13, along which the liquid crystal injection ports 10 are provided, is entirely dipped in the liquid crystal material 14, thereby leaving some liquid crystal material 14 adhered to the liquid crystal panel 13. Furthermore, the tray 12 has to be provided with the liquid crystal material 14 of an amount which is many times the amount of the liquid crystal material 14 needed to actually fill the liquid crystal injection space 11, while the excess liquid crystal material 14 must be disposed of because of the problem of generation of bubbles and contamination from the dipping from the liquid crystal panel 13. As described above, the conventional liquid crystal injection method has a problem in that a large amount of the liquid crystal material 14 is wasted, resulting in an excessive consumption of the liquid crystal material 14. Moreover, there is also another problem that since the liquid crystal material 14 adheres to the entire side of the liquid crystal panel 13, the panel needs to be wiped off, thus requiring a great amount of work for the wiping off.

Furthermore, since a large area of the surface of the liquid crystal material provided in the tray is exposed to a depressurized atmosphere for a long period of time, if a highly volatile liquid crystal material is used, the liquid crystal material deteriorates due to the evaporation of the components thereof.

Furthermore, the principle for injecting the liquid crystal material 14 is merely utilizes the pressure difference between the inside and outside of the liquid crystal panel 13. Therefore, when attempting to realize a liquid crystal panel having a large display area or a liquid crystal panel whose liquid crystal injection space 11 has a relatively small width (gap length) (e.g., a liquid crystal panel for a device which employs a ferroelectric liquid crystal material), a large amount of time will be required for injection, thus inhibiting the productivity. Still another problem is that it takes a long time to form a vacuum in the sealed chamber 1.

Still furthermore, incomplete injection of the liquid crystal material 14 may occur, (i.e., bubbles may remain in the liquid crystal injection space 11), which may critically affect the display performance.

Problems Associated with Conventional Example 2

In the liquid crystal injection method of Conventional Example 2, the injection of the liquid crystal material 14 relies solely upon the evacuation through the evacuation port 82. Thus, the injection requires a long time.

Moreover, when a liquid crystal material is injected into a liquid crystal panel having a large display area or into a liquid crystal panel whose liquid crystal injection space has a relatively small width (gap length) (e.g., a liquid crystal panel for a device which employs a ferroelectric liquid crystal material), the liquid crystal material 14 may not be successfully injected into liquid crystal panel 13' or the liquid crystal material 14 may not be spread uniformly.

SUMMARY OF THE INVENTION

According to one aspect of this invention, a method for injecting a liquid crystal material into a liquid crystal panel which is provided with a liquid crystal injection port and an evacuation port is provided. The method includes the steps of: evacuating the liquid crystal panel; and after the evacuation step, injecting the liquid crystal material into the liquid crystal panel through the liquid crystal injection port with the liquid crystal material being pressurized while evacuating the liquid crystal panel.

In one embodiment of the invention, the liquid crystal injection port is formed substantially in the middle of a first short side of the liquid crystal panel; and the evacuation port is formed near each of opposite ends of a second short side of the liquid crystal panel which opposes the first short side.

According to another aspect of this invention, an apparatus for injecting a liquid crystal material into a liquid crystal panel which is provided with a liquid crystal injection port and an evacuation port is provided. The apparatus includes: first evacuation means for evacuating the liquid crystal panel through the evacuation port; and pressure injection means for injecting the liquid crystal material into the liquid crystal panel through the liquid crystal injection port with the liquid crystal material being pressurized.

In one embodiment of the invention, the pressure injection means includes storage means for storing the liquid crystal material, and collapsing means for collapsing the storage means so as to pressurize the liquid crystal material.

In another embodiment of the invention, the apparatus includes: two or more of the storage means; and second evacuation means for evacuating the storage means.

In still another embodiment of the invention, the apparatus further includes control means for adjusting at least one of an evacuation pressure from the first evacuation means and a pressure from the pressure injection means so that the liquid crystal material is uniformly spread after being injected.

In still another embodiment of the invention, the control means adjusts at least one of an evacuation pressure from the first evacuation means and a pressure from the pressure injection means so as to keep an injection rate at which the liquid crystal material is injected constant.

In still another embodiment of the invention, the pressure injection means includes: a liquid crystal material supply path in a contact zone where the pressure injection means contacts the liquid crystal injection port, with a diameter of the liquid crystal material supply path being larger than a diameter of the liquid crystal injection port; and an evacuation path in a contact zone where the pressure injection means contacts the evacuation port, with a diameter of the evacuation path being larger than a diameter of the evacuation port.

In still another embodiment of the invention, the apparatus further includes heating means for heating and holding at least the liquid crystal panel while the liquid crystal material is injected into the liquid crystal panel.

In still another embodiment of the invention, the apparatus further includes pressing means for pressing the liquid crystal panel in its thickness direction while the liquid crystal material is injected into the liquid crystal panel.

In still another embodiment of the invention, the pressing means is formed of an elastic member which expands and thus presses the liquid crystal panel when a compressed gas is introduced into the elastic member.

In still another embodiment of the invention, the pressing means includes heating means for heating the liquid crystal panel.

In still another embodiment of the invention, the apparatus further includes: thickness measuring means for measuring a thickness of the liquid crystal panel at least at one location on the liquid crystal panel; and adjusting means for adjusting at least one of an evacuation pressure from the first evacuation means and a pressure from the pressure injection means based on a measurement result of the thickness of the liquid crystal panel so as to vary an amount of liquid crystal material to be introduced into the liquid crystal panel.

Hereinafter, the functions of the present invention will be described.

(a) The liquid crystal material is pressurized and injected into the liquid crystal panel through the liquid crystal injection port while the liquid crystal panel is evacuated through the evacuation port. This is efficient and allows for filling of the liquid crystal material into the liquid crystal panel to be achieved with only the least necessary amount of liquid crystal material being injected.

Moreover, there is no excessive liquid crystal material being exposed to a vacuum for a long time. Therefore, there is no deterioration in the liquid crystal material, thus resulting in a high quality.

Furthermore, a sufficient injection pressure is obtained by the pressure injection even when the liquid crystal material is injected into a considerably large liquid crystal panel. Thus, the injection time can be reduced.

Still furthermore, the pressure force from the liquid crystal injection port is utilized as well as the evacuation force from the evacuation port. Thus, it is possible, by adjusting these forces, to inject the liquid crystal material uniformly into the entire liquid crystal panel without generating bubbles therein.

(b) The liquid crystal injection port is formed substantially in the middle of a first short side of the liquid crystal panel, and the evacuation port is formed near each of opposite ends of a second short side of the liquid crystal panel which opposes the first short side. Therefore, the liquid crystal material may be filled uniformly into the liquid crystal panel.

(c) With the liquid crystal injection apparatus of the present invention, the liquid crystal material is pressurized and injected into the liquid crystal panel through the liquid crystal injection port while the liquid crystal panel is evacuated through the evacuation port. This is efficient and allows for filling of the liquid crystal material into the liquid crystal panel to be achieved with only the least necessary amount of liquid crystal material being injected.

Moreover, there is no excessive liquid crystal material being exposed to a vacuum for a long time. Therefore, there is no deterioration in the liquid crystal material, thus resulting in a high quality.

Furthermore, a sufficient injection pressure is obtained by the pressure injection even when the liquid crystal material is injected into a considerably large liquid crystal panel. Thus, the injection time can be reduced.

(d) The pressure injection of the liquid crystal material through the liquid crystal injection port can be easily achieved.

(e) The liquid crystal material to be injected can be degassed in advance. Moreover, since two or more storage means are provided, while a liquid crystal material from one of the storage means is injected into the liquid crystal panel, a liquid crystal material in the other storage means can be degassed and prepared for injection into the following liquid crystal panel. Thus, the productivity can be improved.

(f) Moreover, by adjusting the evacuation force from the first evacuation means and the pressure force from the pressure injection means, it is possible to fill the liquid crystal material uniformly into the liquid crystal panel.

(g) Furthermore, by adjusting the evacuation force from the first evacuation means and the pressure force from the pressure injection means, it is possible to fill the liquid crystal material uniformly into the liquid crystal panel while maintaining the injection rate of the liquid crystal material constant.

(h) Still furthermore, the pressure injection means may include: a liquid crystal material supply path in a contact zone where the pressure injection means contacts the liquid crystal injection port, with a diameter of the liquid crystal material supply path being larger than a diameter of the liquid crystal injection port; and an evacuation path in a contact zone where the pressure injection means contacts the evacuation port, with a diameter of the evacuation path being larger than a diameter of the evacuation port. Therefore, pressure concentration at each contact zone can be reduced, so that the liquid crystal material can be injected uniformly into the liquid crystal panel.

(i) Still furthermore, by heating and holding at least the liquid crystal panel while injecting a liquid crystal material thereinto, the viscosity of the liquid crystal material is reduced so that the liquid crystal material can be injected even faster.

(j) Still furthermore, by providing pressing means for pressing at least the liquid crystal panel in the thickness direction thereof while injecting a liquid crystal material thereinto, it is possible to suppress the distortion of the liquid crystal panel and the displacement of the spacer beads associated with the pressure injection of the liquid crystal material, thus improving the quality of the liquid crystal panel after the liquid crystal material filling.

(k) Still furthermore, providing pressing means which expands by introducing a gas thereinto allows for the entire liquid crystal panel to be uniformly pressed without damaging the liquid crystal panel.

(l) Still furthermore, by providing the pressing means with a mechanism for heating the liquid crystal panel, it is possible to reduce the viscosity of the liquid crystal material and thus to inject the liquid crystal material even faster.

(m) Still furthermore, by providing a thickness measuring means for measuring the thickness of the liquid crystal panel and by varying the amount and time of liquid crystal injection based on the measurement result, it is possible to perform the liquid crystal injection in accordance with the variations in the individual production processes and the individual components. Thus, the reliability of the liquid crystal panel after the liquid crystal material filling can be improved.

Thus, the invention described herein makes possible the advantages of (1) providing a method for injecting a liquid crystal material into a liquid crystal panel in which the liquid crystal material consumption may be minimized, while the productivity and quality of the liquid crystal panel may be improved, and (2) providing a liquid crystal injection apparatus therefor.

These and other advantages of the present invention will become apparent to those skilled in the art upon reading and understanding the following detailed description with reference to the accompanying figures.

BRIEF DESCRIPTION OF THE DRAWINGS

FIG. 2 is a view illustrating a configuration of an exemplary liquid crystal injection apparatus according to Example 1.

FIG. 11 is a view illustrating a configuration of a panel accommodating rack according to Example 2.

DESCRIPTION OF THE PREFERRED EMBODIMENTS

Example 1

Hereinafter, an example of the liquid crystal injection method of the present invention will be described with reference to the accompanying figures.

Figure 1A:
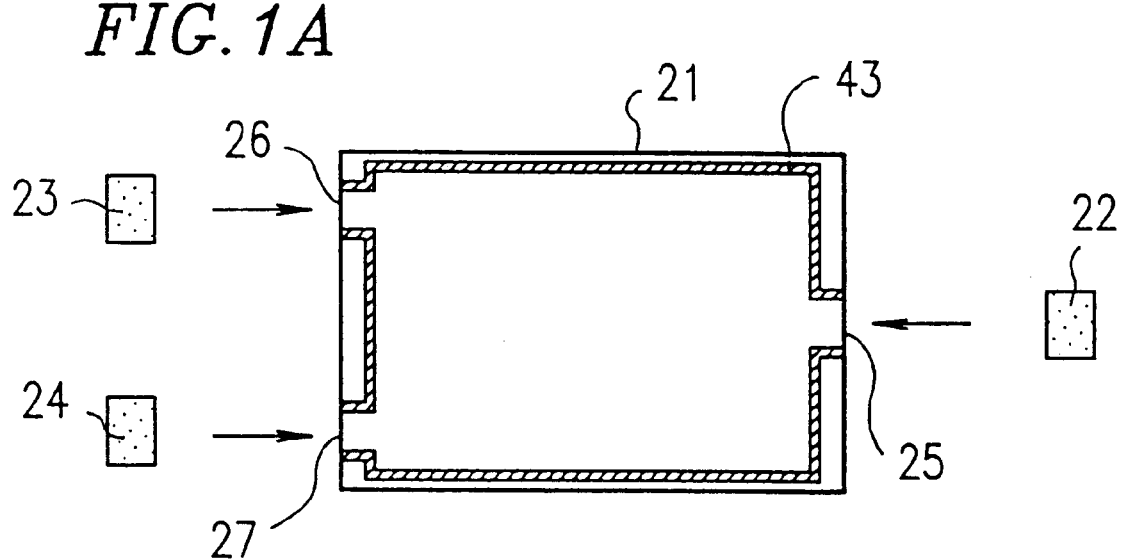
FIGS. 1A to 1C are views illustrating a configuration of a liquid crystal panel used in Example 1.
Figure 1B:
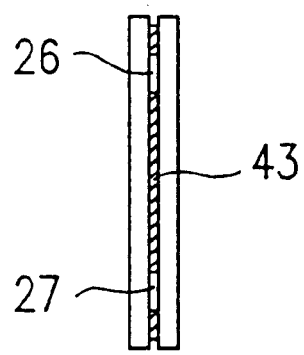
Figure 1C:
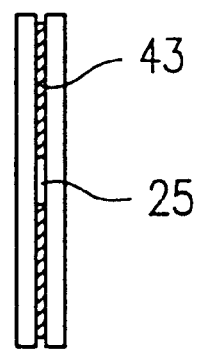

First, the liquid crystal panel used in this example will be described. FIGS. 1A to 1C are views illustrating the configuration of a liquid crystal panel 21. FIG. 1A is a plan view, FIG. 1B is a side view seen from the injection side, and FIG. 1C is a side view seen from the evacuation side. This liquid crystal panel 21 includes a pair of glass plates of the same size adhered to each other with an adhesive layer 43 applied therebetween along their peripheries thereof. An injection space having a minute width is formed between the pair of glass plates. The ring of the adhesive layer 43 is broken off in the middle of one longitudinal side (in the middle of one short side), thereby providing a liquid crystal injection port 25. The ring of the adhesive layer 43 is also broken off near each end of the counter side (near each end of a side opposite to the above-described short side), thereby providing evacuation ports 26 and 27. As shown in FIG. 1A, there are also provided an injection connector 22 and evacuation connectors 23 and 24. These members 22, 23 and 24 are used in liquid crystal injection and will be described later.

Next, a liquid crystal injection apparatus for injecting a liquid crystal material into the liquid crystal panel 21 illustrated in FIGS. 1A to 1C will be described. FIG. 2 is a schematic view illustrating a configuration of an exemplary liquid crystal injection apparatus 100.

Figure 21:
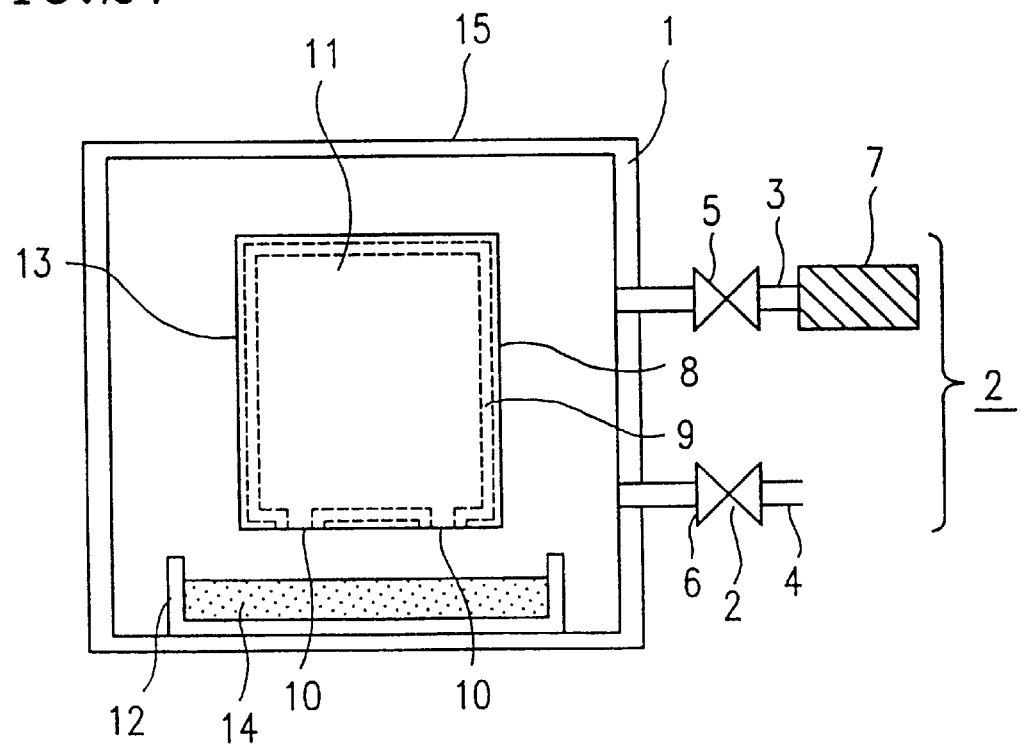
FIG. 21 is a view illustrating the operation of the liquid crystal injection apparatus according to Conventional Example 1.
Figure 22:
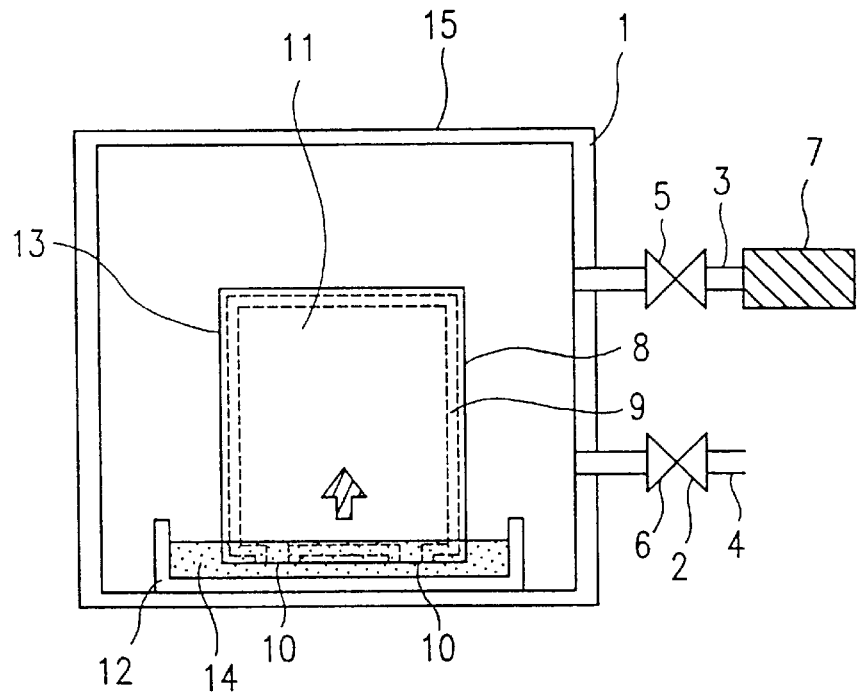
FIG. 22 is another view illustrating the operation of the liquid crystal injection apparatus according to Conventional Example 1.
Figure 23:
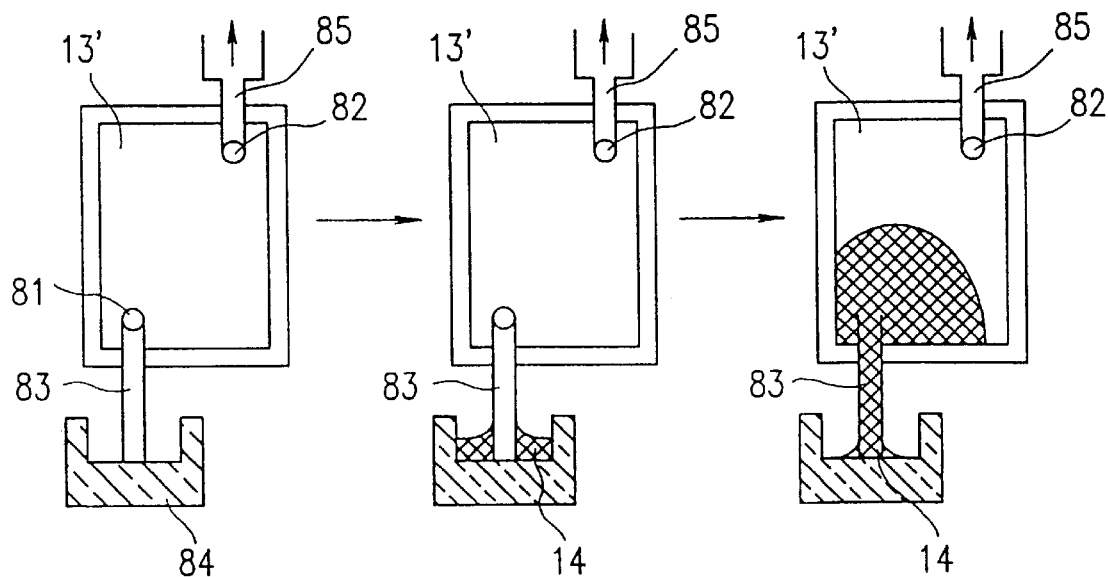
FIG. 23 is a view illustrating the operation of a liquid crystal injection apparatus according to Conventional Example 2.

The liquid crystal injection apparatus 100 includes two separate sections on the opposite sides of the liquid crystal panel 21, i.e., a supply side 101 and an evacuation side 102. The supply side 101 includes a vacuum pump 28, a filter 29, valves 30, 31, 34 and 35, liquid crystal material degassing pressurization tanks 32 and 33, a vacuum indicator 48, and an injection connector 22. The evacuation side 102 includes a vacuum pump 42, a filter 41, a valve 40, a vacuum indicator 49, and evacuation connectors 23 and 24. The elements within the boundary 50 may be compared to the elements of the conventional liquid crystal injection apparatus 15 shown in FIGS. 21 and 22.

In the vicinity of the liquid crystal injection port 25 of the liquid crystal panel 21, an optical sensor 37 is provided which is capable of detecting a liquid crystal material being injected. The optical sensor 37 allows for the actual injection condition to be checked in the beginning of the injection and thus allows for a trouble to be detected in early stages. Moreover, another optical sensor 38 having the similar functions as that of the optical sensor 37 is provided substantially in the middle between the evacuation ports 26 and 27. The optical sensor 38 detects that the liquid crystal material injected through the injection port 25 has filled and reached up to the location of the optical sensor 38, thus providing an appropriate timing to finish the injection operation.

The vacuum pump 28, the filter 29, the valves 30, 31, 34 and 35, the liquid crystal material degassing pressurization tanks 32 and 33, and the vacuum indicator 48 are connected to a supply control section (not shown). The vacuum pump 42, the filter 41, the valve 40, and the vacuum indicator 49 are connected to a evacuation control section (not shown). The supply control section, the evacuation control section, and the optical sensors 37 and 38 are connected to a host computer for this injection system. Thus, the injection operation to be described below is satisfactorily achieved.

Figure 3A:
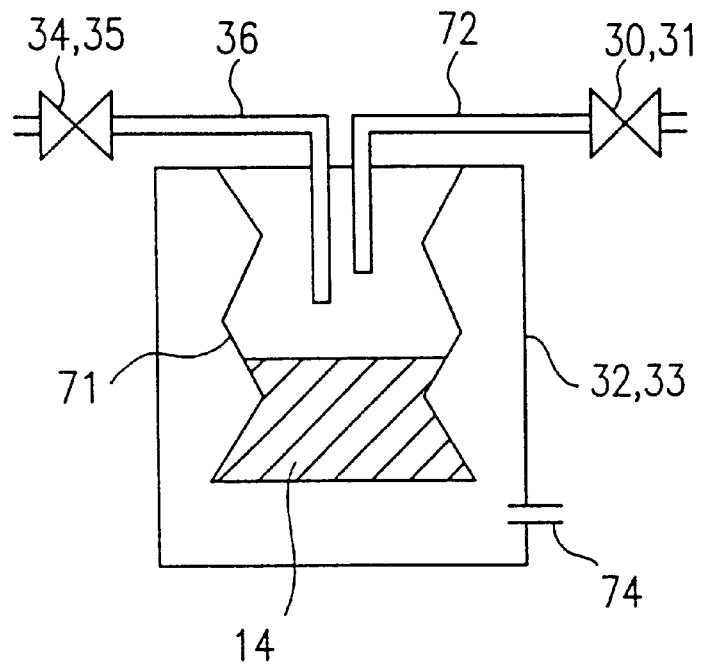
FIGS. 3A and 3B are views illustrating a configuration of a liquid crystal material degassing pressurization tank.
Figure 3B:
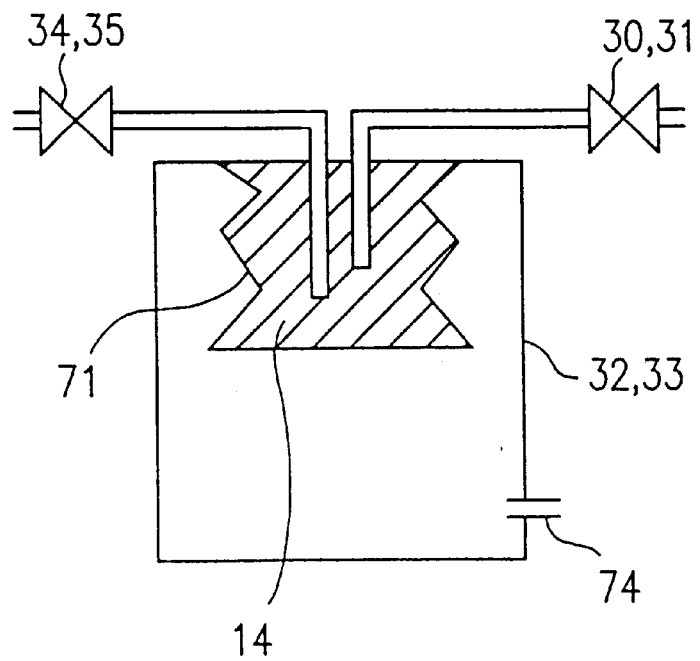

Next, the liquid crystal material degassing pressurization tank 32 (33) will be described in detail. As illustrated in FIGS. 3A and 3B, the liquid crystal material degassing pressurization tank 32 (33) includes an accordion container 71, into which an evacuation pipe 72 and an injection pipe 36 are inserted. The evacuation pipe 72 is connected to the vacuum pump 28 via the valve 30 (31) and the filter 29. On the other hand, the injection pipe 36 is connected to the injection connector 22 via the valve 34 (35). As illustrated in FIGS. 3A and 3B, the accordion container 71 is formed to be collapsible/expandable. The accordion container 71 collapses as illustrated in FIG. 3B when air is injected thereinto through a pressurized pipe 74, thereby pressurizing the liquid crystal material 14, whereas it expands as illustrated in FIG. 3A when air is released therefrom.

Figure 4A:
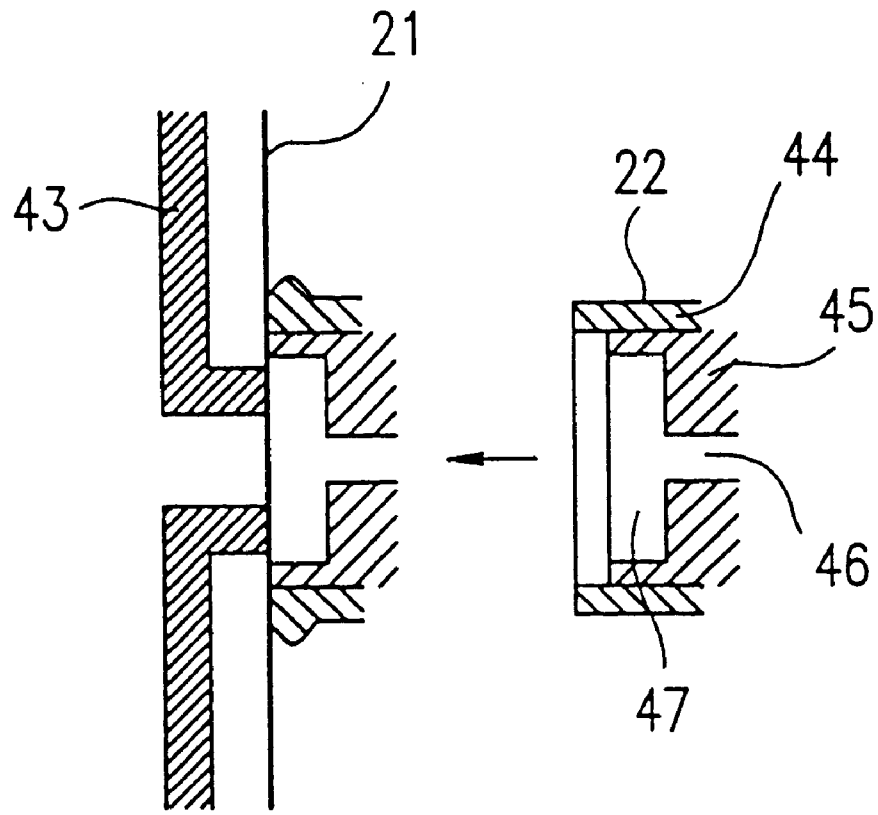
FIGS. 4A and 4B are views illustrating connection between an injection connector and an injection port.
Figure 4B:
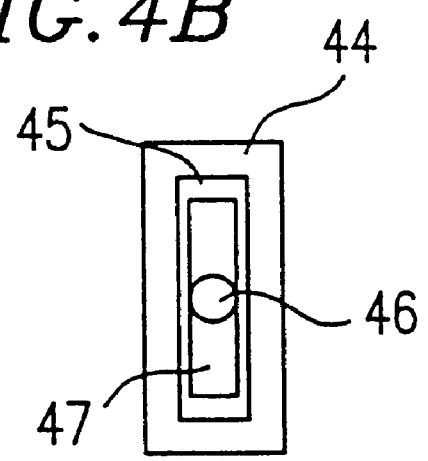

Next, the liquid crystal injection connector 22 and the evacuation connectors 23 and 24 will be described in detail. FIG. 4A is an enlarged view illustrating how the injection connector 22 and the liquid crystal panel 21 are connected to each other. The injection connector body 44 is made of a silicon rubber. When the injection connector body 44 is attached at a predetermined position of the liquid crystal panel 21, it elastically deforms so as to secure adherence therebetween. A supply port 45 is provided within the injection connector body 44. The supply port 45 includes a cavity 47 provided at the end surface thereof, where a pool of liquid crystal of a predetermined volume is formed when the supply port 45 is being attached to and pressed against the panel 21. The inner wall of the injection nozzle 46 which communicates with the supply port 45 is made of Teflon, which is highly water-repellant. The liquid crystal material is introduced into the liquid crystal panel 21 through the injection nozzle 46. FIG. 4B is a view of the injection connector 22 seen from the opening side thereof. The cavity 47 is formed to be considerably wider than the injection port 25 so that the precision required for the positioning of the injection connector 22 to the injection port 25, illustrated in FIG. 1A, is not so high. Moreover, although not shown in FIGS. 4A and 4B, the evacuation connectors 23 and 24 each have a configuration similar to that of the injection connector 22. The evacuation connectors 23 and 24 can also be positioned and attached to the evacuation ports 26 and 27, as illustrated in FIG. 1A.

Figure 13:
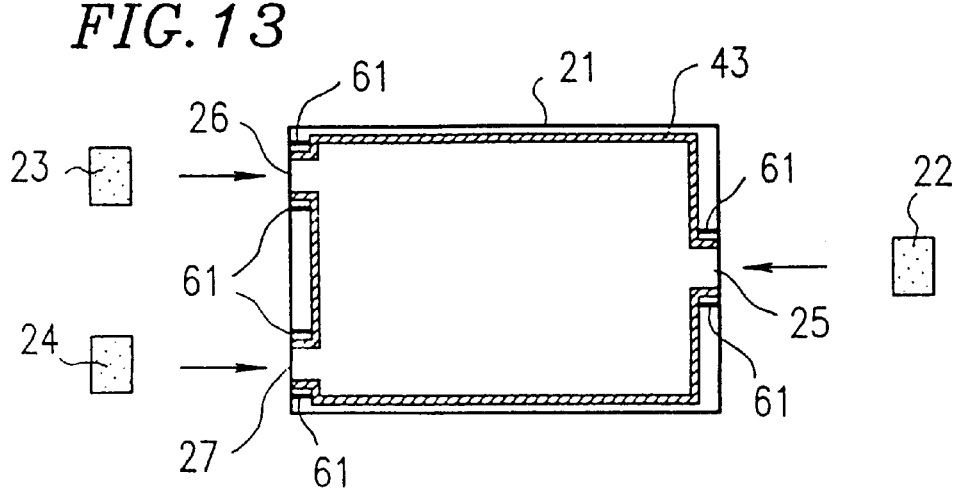
FIG. 13 is a view illustrating a desirable configuration of connecting sections of a liquid crystal panel where it is connected to an injection connector and evacuation connectors.

When the cavity 47 of the injection connector 22 and the evacuation connectors 23 and 24 is formed to have a diameter larger than that of the evacuation ports 26, a leak of the liquid crystal material may occur through the connector section. Therefore, it is desirable to provide a sealing section for preventing such a leak in the vicinity of the contact zones of the liquid crystal panel 21 where it is in contact with the injection connector 22 and the evacuation connectors 23 and 24. For example, it is desirable to, as illustrated in FIG. 13, provide a sealing section 61 by forming a double-layered adhesive layer 43 at the attachment sections of the liquid crystal panel 21 where it is attached to the injection connector 22 and the evacuation connectors 23 and 24, or to form the adhesive layer 43 to be wider at the attachment sections of the liquid crystal panel 21 where it is attached to the injection connector 22 and the evacuation connectors 23 and 24.

Next, referring to FIGS. 1A to 4B, an example of the liquid crystal injection method of the present invention will be described for each step.

(1) The injection connector 22 of the liquid crystal injection apparatus 100 is attached to the injection port 25 of the liquid crystal panel 21, while the evacuation connectors 23 and 24 are attached to the evacuation ports 26 and 27. At this point, the liquid crystal material degassing pressurization tanks 32 and 33 are in the expanded position, as illustrated in FIG. 3A.

(2) Then, the valves 30, 31, 35 and 40 are opened. At this point, since the valve 34 is closed, the liquid crystal material 14 in the liquid crystal material degassing pressurization tank 32 is degassed. Moreover, since the valves 31, 35 and 40 are open, the liquid crystal panel 21 is evacuated by the vacuum pumps 28 and 42 from the injection side and from the evacuation side, respectively. Herein, on the injection side, the evacuation is performed through the upper portion (which is not filled with the liquid crystal material) of the liquid crystal material degassing pressurization tank 33.

(3) Subsequently, when the degree of vacuum in the liquid crystal panel 21 as measured by the vacuum indicator 48 or 49 reaches the predetermined value, the valves 35 and 30 are closed while the valve 34 is opened. This initiates injection of the liquid crystal material 14 from the liquid crystal material degassing pressurization tank 32 into the liquid crystal panel 21. At this point, on the evacuation side, the liquid crystal panel 21 is evacuated by the vacuum pump 42. On the injection side, an air is injected into the liquid crystal material degassing pressurization tank 32 through the pressurized pipe 74 so as to pressurize the liquid crystal material 14 (see FIG. 3B). The pressurization control of the liquid crystal material degassing pressurization tank will be described later.

During the injection of the liquid crystal material 14, the liquid crystal material degassing pressurization tank 33 is being degassed by the vacuum pump 28.

(4) Then, when the optical sensor 38 provided on the evacuation side detects the liquid crystal material being filled, the valves 31 and 40 are closed, thus finishing the injection of the liquid crystal material 14.

(5) A leak operation is initiated so that the pressure inside the liquid crystal panel 21 gradually approaches the atmospheric pressure.

(6) When the pressure inside the liquid crystal panel 21 reaches the atmospheric pressure, the injection connector 22 and the evacuation connectors 23 and 24 are detached from the liquid crystal panel 21.

(7) Injection of the liquid crystal material into other liquid crystal panels is performed by repeating the operations (1) to (6).

In the present example, the injection of the liquid crystal material is performed as described above. According to this method of injecting the liquid crystal material, the liquid crystal material is pressurized when it is introduced into the liquid crystal panel from the injection side. As a result, the injection can be performed at a high speed. For example, the amount of time required for the liquid crystal injection can be reduced down to about 1/20 to 1/10 of that of the method according to Conventional Example 1. Thus, the productivity of the liquid crystal display device can be improved.

Moreover, the present method is efficient in that only the necessary amount of liquid crystal material has to be introduced. Furthermore, since the liquid crystal material to be introduced is degassed, the reliability of the liquid crystal panel can be improved.

Furthermore, since the liquid crystal material pool having a diameter larger than that of the injection port is formed in the connecting section of the injection connector where it is connected to the liquid crystal panel, pressure is not concentrated to the connecting section during injection. Thus, the liquid crystal material can be injected uniformly into the liquid crystal panel.

Still furthermore, if the injection connector is provided in the middle of one side of the liquid crystal panel while the evacuation connector is provided in the vicinity of each end of the opposite side, the flow of the liquid crystal material to be injected into the liquid crystal panel becomes uniform, and bubble generation inside the liquid crystal panel can be suppressed. Moreover, the liquid crystal panel can be completely filled with the liquid crystal material.

Still furthermore, since two liquid crystal material degassing pressurization tanks are provided, while the liquid crystal material in one of the liquid crystal material degassing pressurization tanks is injected into the liquid crystal panel, the liquid crystal material in the other of the liquid crystal material degassing pressurization tanks can be degassed and prepared for injection into the following liquid crystal panel. Thus, the productivity can be improved.

Figure 5A:
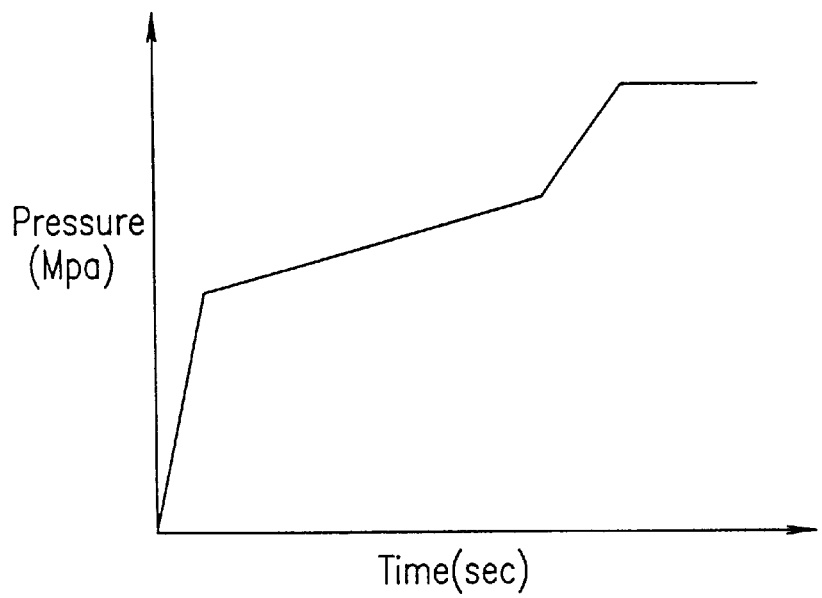
FIGS. 5A and 5B are views illustrating an example of a pressurization control using a liquid crystal material degassing pressurization tank.
Figure 5B:
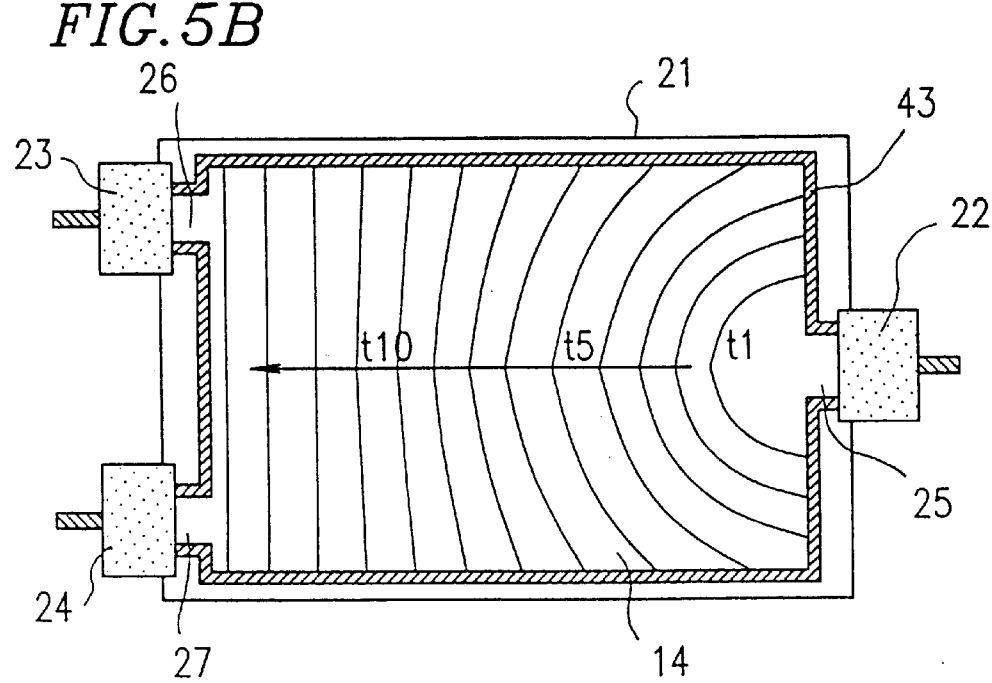

Next, the pressurization control of the liquid crystal material degassing pressurization tank will be described. FIG. 5A is a view illustrating an example of a liquid crystal injection pressure profile during the liquid crystal injection. The pressure profile shows a profile when the pressure in the liquid crystal material degassing pressurization tank is controlled so that the injection rate of the liquid crystal material 14 is constant from beginning to end of the injection, with the evacuation pressure on the evacuation side being constant. FIG. 5B is a view showing the liquid crystal injection over time (at room temperature) when the liquid crystal material 14 is injected based on the pressure profile shown in FIG. 5A. In the figure, contour lines t1 to t10 each represent the front line of the liquid crystal material 14 at a point in time, where t5 and t10 respectively indicate elapsed time that is five and ten times the elapsed time at t1. The arrow in the figure represents the injection direction. As shown in the figure, when the liquid crystal material 14 is injected based on the pressure profile, the liquid crystal material 14 is injected in a direction generally along the longitudinal direction of the liquid crystal panel 21 near the end (the evacuation side) of the liquid crystal panel 21, and the bubble generation in the liquid crystal panel 21 or incomplete injection does not occur.

Figure 6:
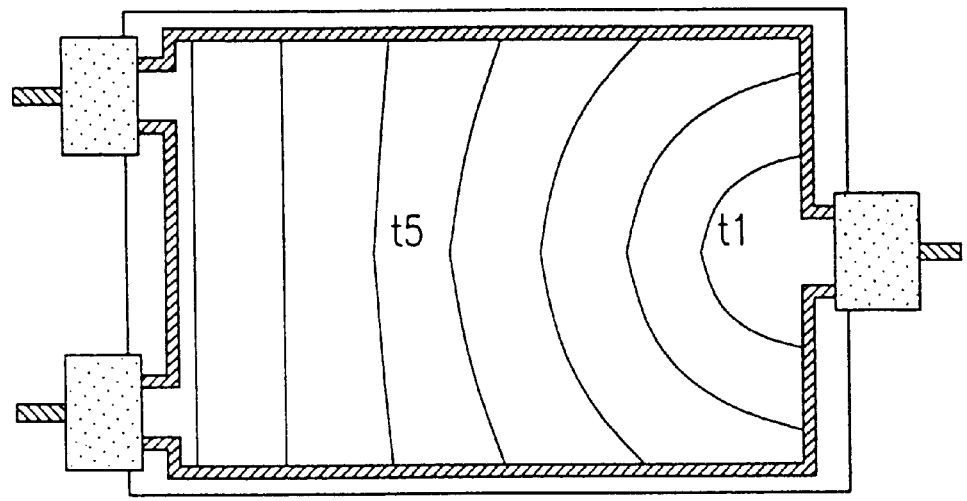
FIG. 6 is a view illustrating liquid crystal injection in the case where the liquid crystal material is heated while being injected.

The amount of time required for the injection of the liquid crystal material 14 can be further reduced by maintaining the liquid crystal material 14 at a high temperature and thus lowering the viscosity thereof. FIG. 6 is a view showing the liquid crystal injection over time under a high temperature condition (about 40° C.). As shown in the figure, under a high temperature condition, the amount of time required for the liquid crystal injection can be reduced by half.

Herein, the pressure in the liquid crystal material degassing pressurization tanks 32 and 33 is controlled so that the injection rate of the liquid crystal material 14 becomes constant. However, the control can be performed in any manner as long as the liquid crystal material 14 is spread uniformly over the entire liquid crystal panel 21. Of course, it is also applicable to control the injection rate or the injection pressure by utilizing the evacuation force from the vacuum pump 42. Moreover, it is also applicable to control the pressure force from the liquid crystal material degassing pressurization tanks 32 and 33 and the evacuation force from the vacuum pump 42 based on the values indicated by the vacuum indicator 48 on the injection side and the vacuum indicator 49 on the evacuation side.

Furthermore, in the above description, the liquid crystal material 14 is pressurized by the collapsing operation of the accordion container 71. However, other means can also be employed as long as it pressurizes and introduces the liquid crystal material 14 to the injection port.

Example 2

Next, Example 2 of the present invention of the liquid crystal injection method will be described referring to FIGS. 7 to 12.

In the present example, although the liquid crystal material is simultaneously injected into a plurality of liquid crystal panels, the operation of injecting a liquid crystal material into each liquid crystal panel is the same as in Example 1, and thus will not be further described below. The same reference numerals are used for the components same as in Example 1.

Figure 7:
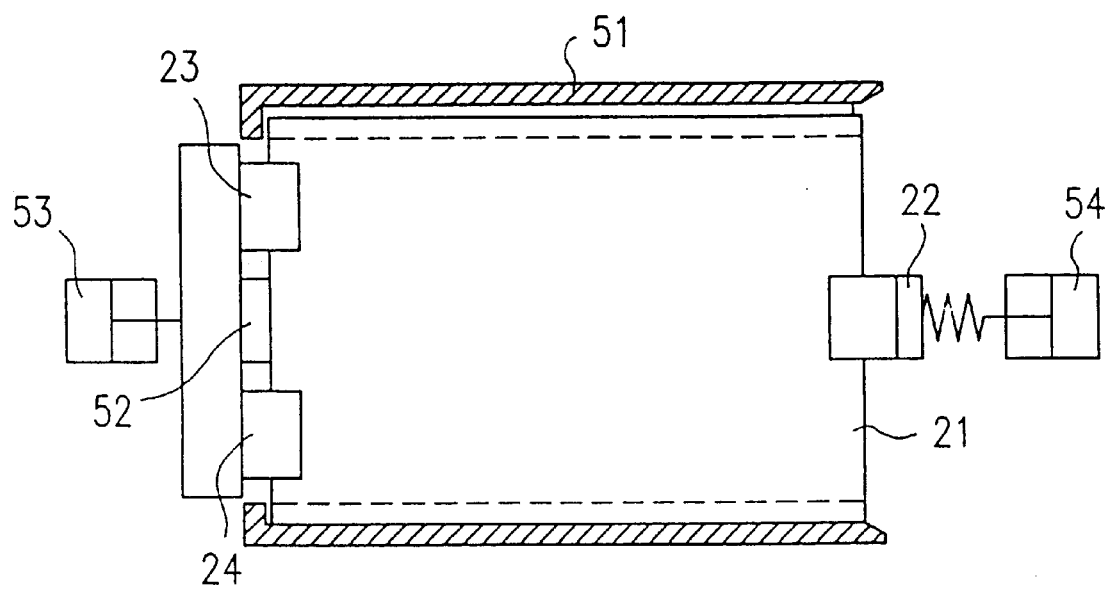
FIG. 7 is a view illustrating a configuration of an example of a liquid crystal injection apparatus according to Example 2.
Figure 8:
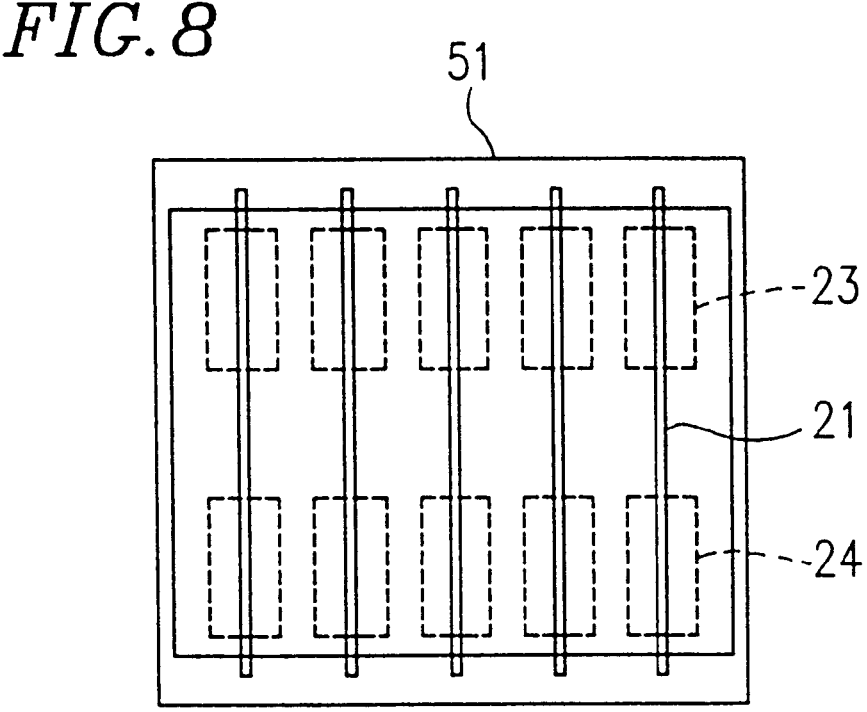
FIG. 8 is a view of the liquid crystal injection apparatus illustrated in FIG. 7 as viewed from the evacuation port side.
Figure 9:
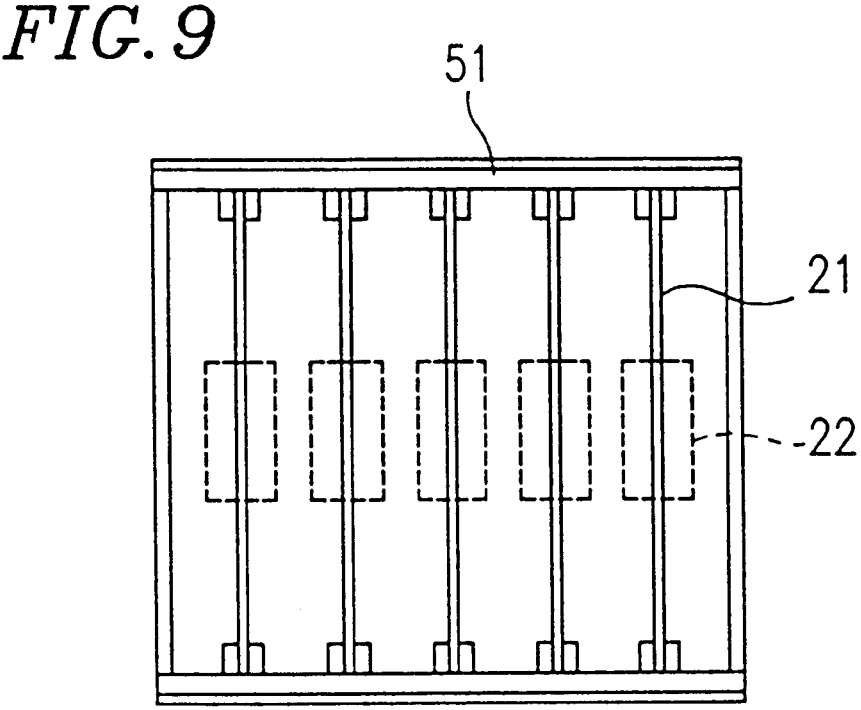
FIG. 9 is a view of the liquid crystal injection apparatus illustrated in FIG. 7 as viewed from the injection port side.

FIG. 7 is a view illustrating the liquid crystal injection method according to the present example. FIG. 8 is a view illustrating the configuration shown in FIG. 7 as seen from the side of the evacuation connectors 23 and 24 (i.e., from the left in FIG. 7). FIG. 9 is a view illustrating the configuration shown in FIG. 7 as seen from the side of the injection connector 22 (i.e., from the right in FIG. 7). As shown in these figures, a plurality (five in this example) of the liquid crystal panels 21 are guided in a panel accommodating rack 51. The panel accommodating rack 51 is formed of a material which is not charged with electricity, such as a liquid crystal polymer containing a carbon filler, so as to prevent the liquid crystal panels from being damaged due to static electricity.

The injection connector 22 and the evacuation connectors 23 and 24 are attached to each liquid crystal panel 21. Reference numerals 53 and 54 each denote an air table provided with a direct-acting guide. A double-acting mechanism is provided between the air table 54 and the injection connector 22 on the side of the tip of the air table 54.

A liquid crystal material is injected into the liquid crystal panel 21 so configured through each injection connector 22 by the same procedures as in Example 1.

Now, the attachment procedure of the injection/evacuation connectors 22, 23 and 24 will be described with reference to FIGS. 10A to 10D, 11 and 12.

Figure 10A:
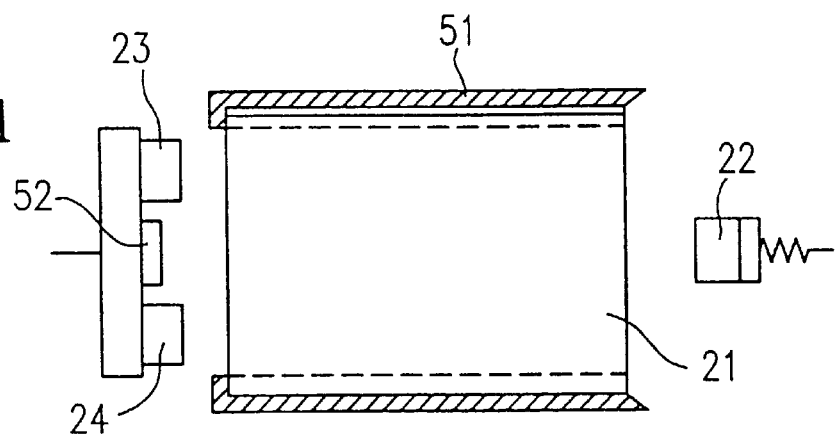
FIGS. 10A to 10D are views illustrating a connection process of an injection connector and evacuation connectors according to Example 2.
Figure 12:
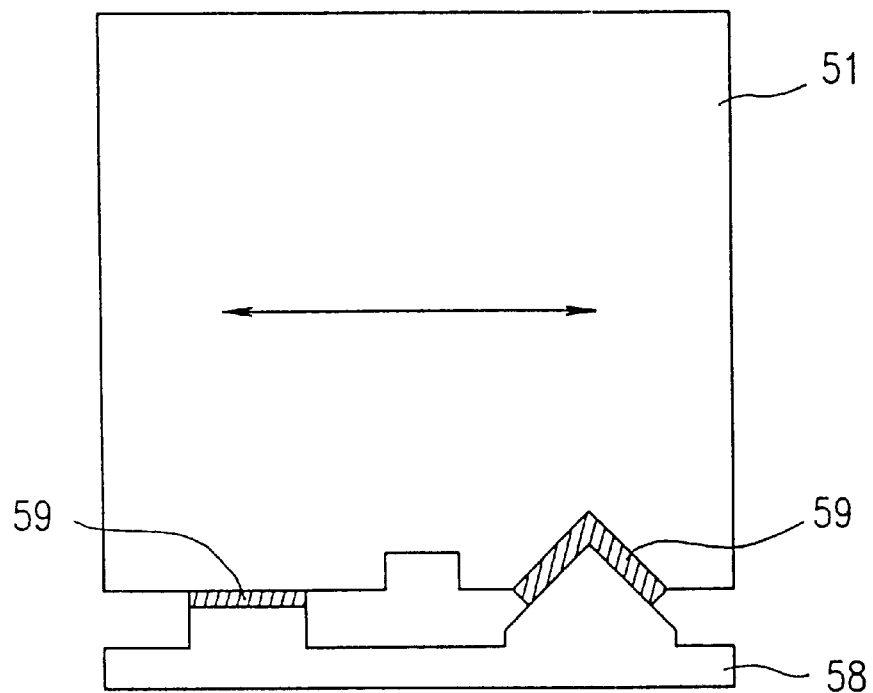
FIG. 12 is a view illustrating the panel accommodating rack illustrated in FIG. 11 as viewed from a different angle.

(1) First, the panel accommodating rack 51 is set (see FIG. 10A). The panel accommodating rack 51 is configured as illustrated in the side views of FIGS. 11 and 12, thus enabling precise positioning. That is, the panel accommodating rack 51 is interposed between ball bearings 55 and 56 shown in FIG. 11 via a V-shaped groove formed in the panel accommodating rack 51, and is pressed toward the ball bearing 55 by an air cylinder 57 which is provided with a double-acting mechanism. Thus, the panel accommodating rack 51 can be restricted from moving in the directions indicated by the arrows in FIG. 11. Moreover, since flat guides 59 are provided between an apparatus base 58 and the panel accommodating rack 51, as illustrated in FIG. 12, the panel accommodating rack 51 can be restricted from moving in the direction indicated by the arrow in FIG. 12.

Figure 10B:
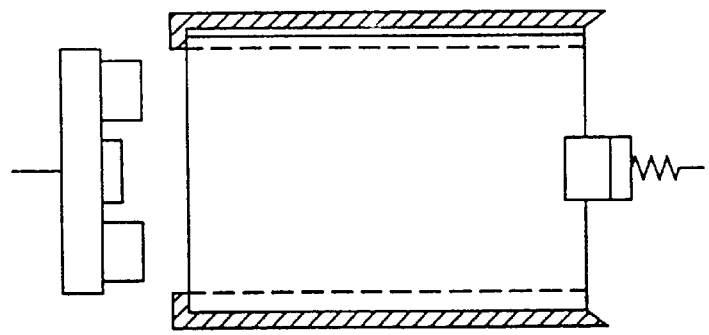

(2) Then, by using the air table 54, the injection connector 22 is biased in a double-acting manner so as to be attached to the liquid crystal panel 21 (see FIG. 10B).

Figure 10C:
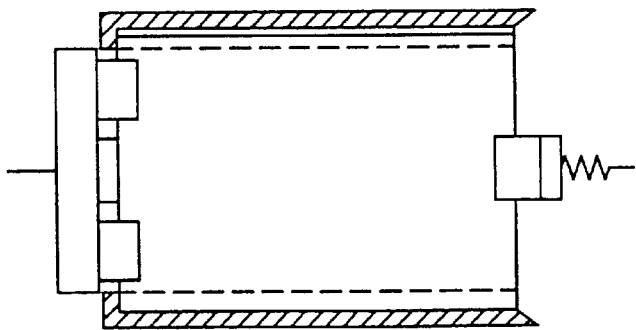
Figure 10D:
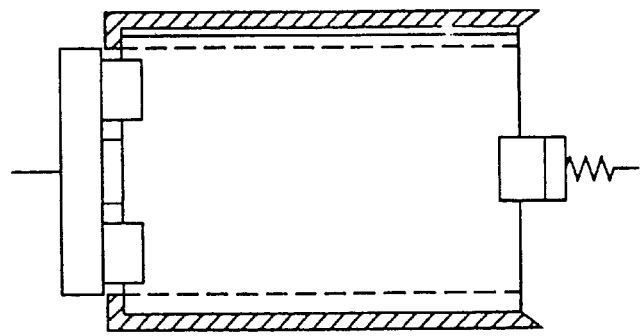

(3) Then, by using the air table 53, the evacuation connectors 23 and 24 are attached to the liquid crystal panel (see FIG. 10C). A protrusion 52 controls the amount of force applied to press the evacuation connectors 23 and 24 against the liquid crystal panel.

(4) Moreover, the evacuation connectors 23 and 24 are biased to a predetermined pressing force so as to ensure adherence between each connector and the liquid crystal panel, whereby there is no leak therethrough.

As described above, by connecting the injection connector and the evacuation connector to each of the plurality of liquid crystal panels, the liquid crystal material can be simultaneously injected into the plurality of liquid crystal panels, thereby improving the productivity.

Example 3

With the liquid crystal injection method described in Examples 1 and 2, it is possible to realize excellent effects such as (1) the amount of time required for the liquid crystal injection can be considerably reduced, (2) liquid crystal material is not wasted, thereby improving the productivity, (3) since the liquid crystal material to be injected is degassed, the reliability of the liquid crystal panel can be improved. However, when the injection pressure (pressure force) is further increased in an attempt to further reduce liquid crystal injection time, the display quality of the liquid crystal display device after the injection is lowered. This will be discussed below.

Normally, a glass plate about 0.7 mm thick is used in a liquid crystal panel. In this case, when the injection pressure (pressure force) of the liquid crystal material is increased, expansion occurs in the vicinity of the injection port during the liquid crystal injection process, and the spacer beads, which maintain the thickness of the liquid crystal injection space of the liquid crystal panel, are flushed and displaced by the flow of the pressurized liquid crystal material.

Figure 14A:
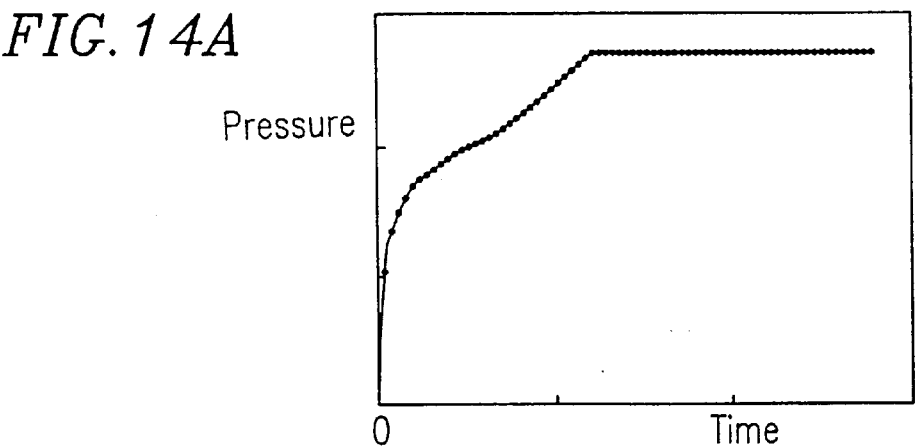
FIGS. 14A to 14C are views showing simulation results for illustrating problems when an injection pressure (pressure force) is large.
Figure 14B:
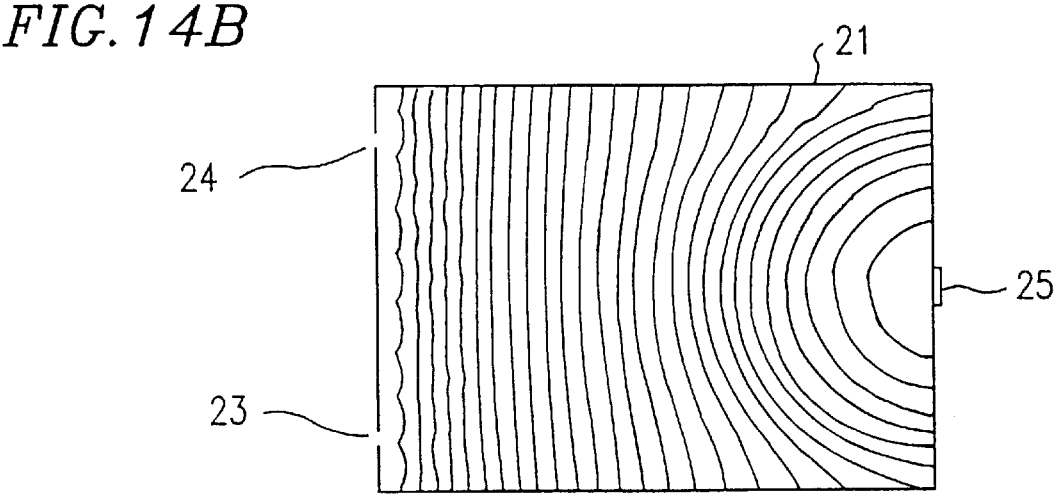
Figure 14C:
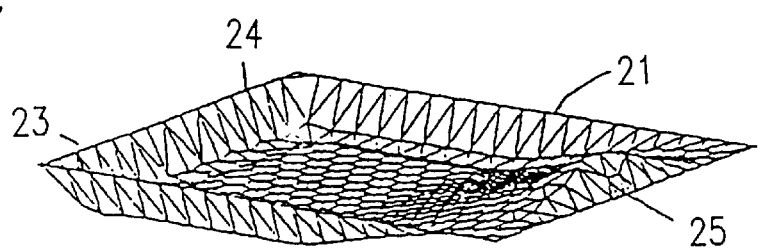

FIGS. 14A to 14C show simulation results for the case where a liquid crystal material is injected into a 13.8-inch liquid crystal panel using the liquid crystal injection apparatus shown in Example 1 (FIG. 2). Hereinafter, the simulation results shown in FIGS. 14A to 14C are described with reference to FIG. 2.

FIG. 14A shows an injection pressure profile, i.e., changes over time in the injection pressure (pressure force) of the liquid crystal material injected through the injection port 25. As shown in the figure, the injection pressure (pressure force) is increased gradually over time up to the maximum value of about 0.175 Mpa (where the evacuation pressure is about 0.5 Torr). FIG. 14B illustrates how the liquid crystal material flows toward the evacuation ports 26 and 27 after being injected through the liquid crystal injection port 25, based on the injection pressure profile shown in FIG. 14A (it is assumed that the liquid crystal panel 21 is under ambient pressure). FIG. 14C is a perspective view illustrating one of the pair of two glass plates, which form the liquid crystal panel 21, from beginning to end of the liquid crystal injection under the condition as shown in FIGS. 14A and 14B. In the figure, the injection port 25 is on the right, and the evacuation ports 26 and 27 are on the left. Moreover, the liquid crystal display space exists below the glass plate in the figure, while the other glass plate exists symmetrically further below the liquid crystal display space, with the liquid crystal display space being symmetric line. As shown in FIG. 14C, the glass plate is distorted. Particularly, it is considerably raised near the injection port 25 (the other glass plate is similarly distorted). The distortion reaches as much as about 1/100 to 1/50 of the diameter of the spacer beads, which define the liquid crystal display space (i.e., define the interval between the pair of glass plates), thus causing the spacer bead displacement or an increase in the liquid crystal panel 21 thickness near the injection port 25, resulting in a display quality failure.

In the present example, a liquid crystal injection method will be described which can suppress such deterioration of the quality of the liquid crystal panel 21 associated with the increase in the injection rate of the liquid crystal material. It should be noted that the following description is set forth for the case where the liquid crystal material is simultaneously injected into a plurality of liquid crystal panels, as shown in FIGS. 7 to 12 and described in Example 2. The components and structure that are the same as those in Examples 1 and 2 will not be further described below.

First, as in Example 2, the liquid crystal panel 21 is mounted in the panel rack 51 (see FIG. 7). Herein, the panel rack 51 is formed of a material obtained by containing a carbon filler in a resin material such as PPS or LCP, in view of the coefficient of thermal expansion, the contraction coefficient, the moldability and the static electricity.

Figure 15:
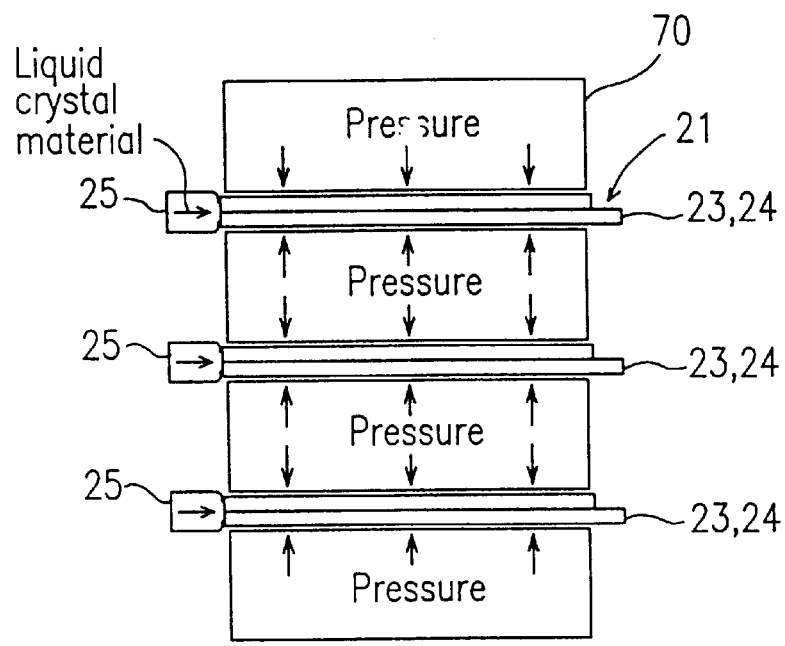
FIG. 15 is a view illustrating a liquid crystal injection method according to Example 3.

Then, the filling process using the liquid crystal material is performed using the method described in Examples 1 and 2. During the filling process, as shown in FIG. 15, jigs 70 are arranged so as to interpose each liquid crystal panel 21 in the thickness direction. The jig 70 is formed to be capable of pressing the liquid crystal panel 21 and is formed of an elastic material such as that of a rubber balloon.

The jigs 70 interpose the liquid crystal panel 21 in the thickness direction at a predetermined pressure during the liquid crystal injection, thus restricting the above-described distortion of the liquid crystal panel 21.

Figure 16:
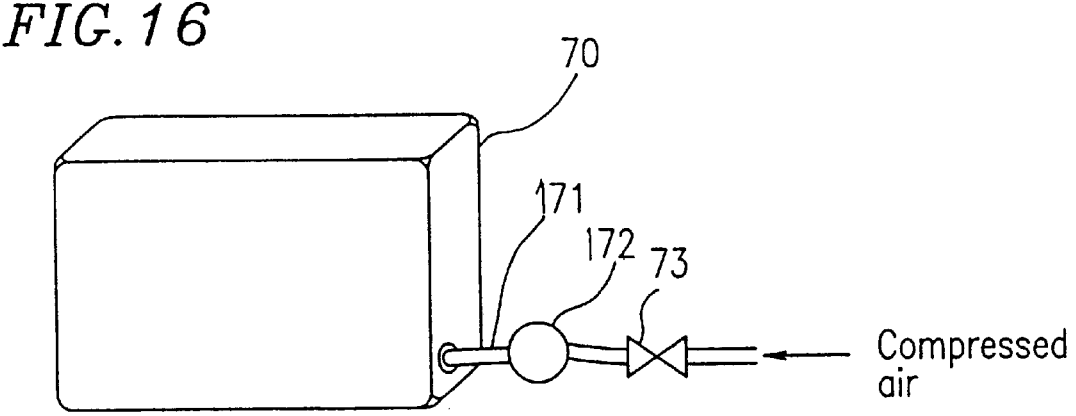
FIG. 16 is a view illustrating a configuration of a jig shown in FIG. 15.

FIG. 16 is a view illustrating an exemplary configuration of the jig 70. Attached to the jig 70 is a pressure pipe 171 which is filled with a compressed air. A pressure detection sensor 172, a valve 73 and a pressure control section (not shown) are provided for controlling the compressed air into/out of the jig 70 through the pressure pipe 71. Due to such a configuration, the liquid crystal panel 21 can be pressed from the opposite sides in the thickness direction at a desired pressure during liquid crystal injection. Moreover, when the jig 70 is made of a thin rubber such as that used for a rubber balloon, the entire surface of the liquid crystal panel 21 can be uniformly pressed without damaging the liquid crystal panel 21. Furthermore, since the thermal capacity is small, it is possible to easily realize liquid crystal injection with the liquid crystal panel 21 being heated by using hot air as the compressed air to expand the jig 70 (i.e., to press the liquid crystal panel 21), thus enabling an even faster liquid crystal injection as described above.

Figure 17A:
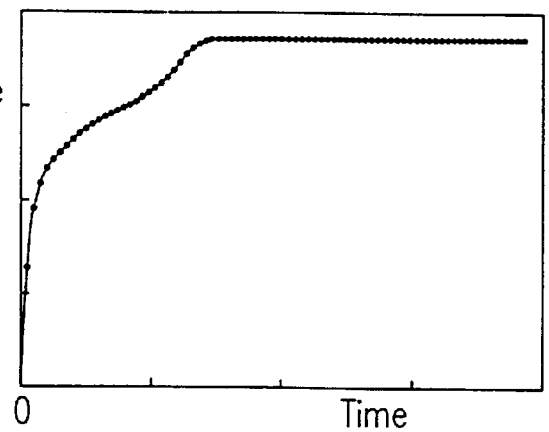
FIGS. 17A to 17C are views illustrating simulation results of liquid crystal injection by the liquid crystal injection method according to Example 3.
Figure 17B:
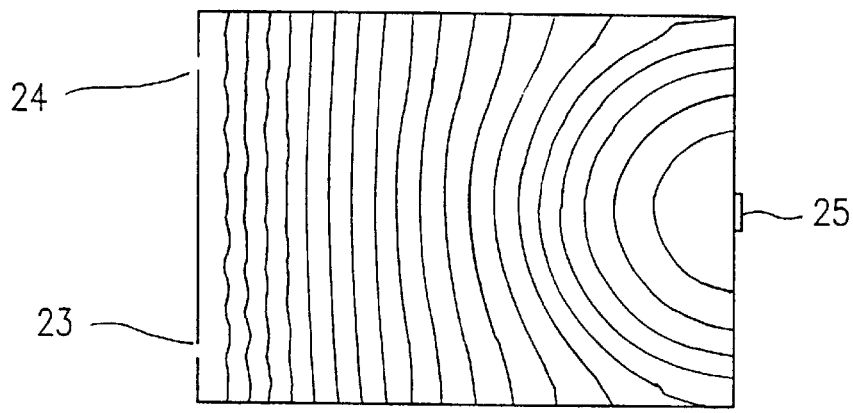
Figure 17C:
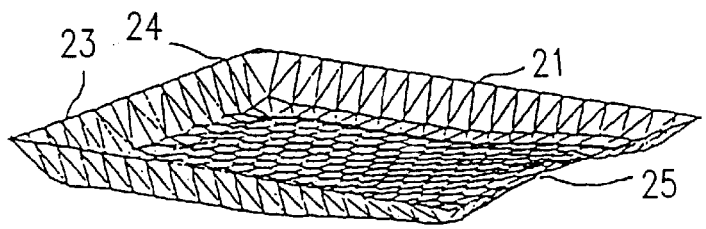

FIGS. 17A to 17C show simulation results of liquid crystal injection in the case where the above-described method (i.e., the method of using the jigs to interpose the liquid crystal panel from the opposite sides) is applied to injection of the liquid crystal material into the 13.8-inch liquid crystal panel. Hereinafter, with reference to the schematic view of FIG. 2 illustrating the configuration of the liquid crystal injection apparatus, the simulation results shown in FIGS. 14A to 14C will be described.

FIG. 17A shows an injection pressure profile, i.e., a view showing changes over time in the pressure of the liquid crystal material to be injected through the injection port 25. As shown in the figure, the injection pressure (pressure force) is gradually increased up to the maximum of about 0.275 Mpa (where the evacuation pressure is about 0.5 Torr). FIG. 17B shows how the liquid crystal material flows toward the evacuation ports 26 and 27 during the injection after being injected through the liquid crystal injection port 25. FIG. 17C is a view illustrating deformation of one of the pair of glass plates, which form the liquid crystal panel 21, from beginning to end of the liquid crystal injection. In the figure, the injection port 25 is on the right, and the evacuation ports 26 and 27 are on the left side. Moreover, the liquid crystal display space exists below the glass plate in the figure, while the other glass plate exists symmetrically further below the liquid crystal display space, with the liquid crystal display space being symmetric line.

As compared to the simulation results shown in FIGS. 14A to 14C, the simulation results shown in FIGS. 17A to 17c are based on a condition where the maximum injection pressure (the injection pressure (pressure force) in the latter half of the graph in FIGS. 14A and 17A where the injection pressure becomes constant) is increased about 1.5-fold, and where the jigs 70 press the liquid crystal panel 21 at a pressure of atmospheric pressure plus about 0.1 Mpa.

As can be seen by comparing FIG. 14C with FIG. 17C, distortion near the injection port 25 is considerably suppressed in the present example (FIG. 17C). The distortion amount in the present example is about 1/5000 of the spacer bead diameter, which is a level having little or no effect on the quality of the liquid crystal panel 21. Moreover, since the injection pressure is increased about 1.5-fold, as can be seen by comparing FIG. 14B with FIG. 17B, the liquid crystal injection rate is further increased in the present example. Therefore, the amount of time required for liquid crystal injection can be reduced to be about 70% of that in Examples 1 and 2.

Figure 18A:
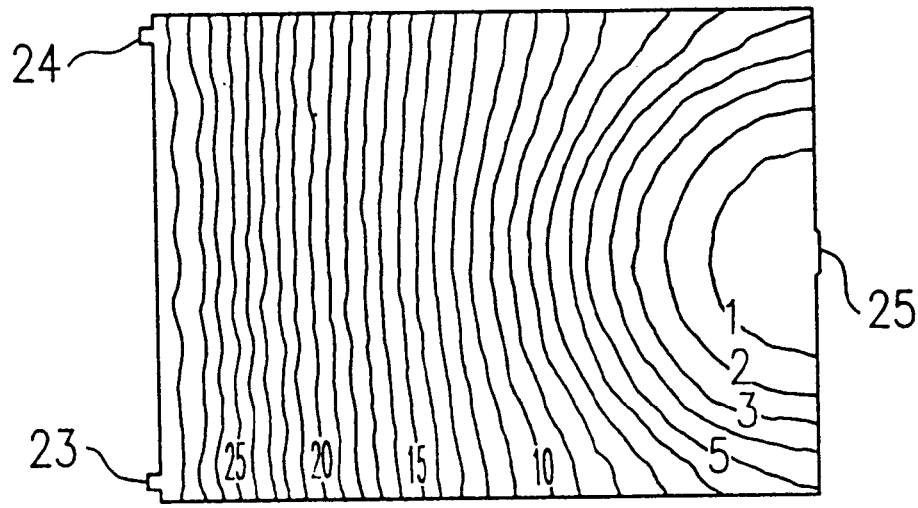
FIGS. 18A and 18B are views illustrating simulation results of liquid crystal injection when a warm air is introduced into the jig illustrated in FIG. 16.
Figure 18B:
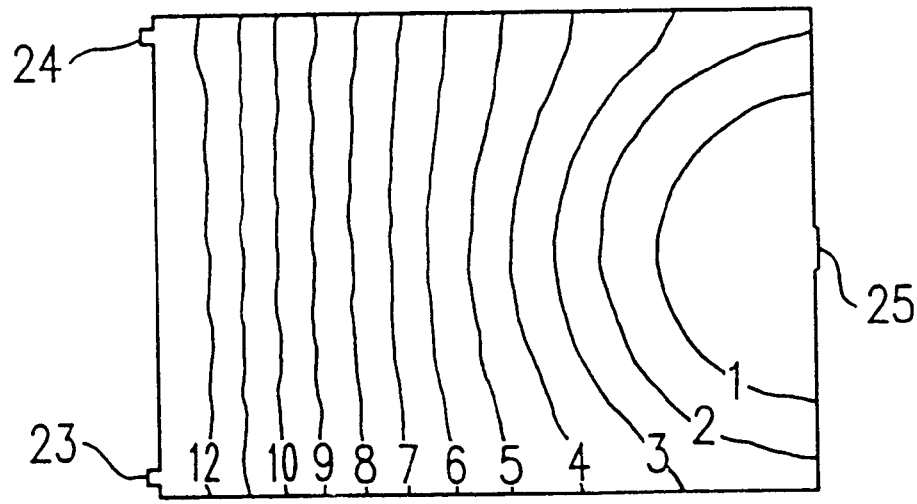

FIGS. 18A and 18B are views showing the simulation results of the liquid crystal injection when employing the method of pressing the liquid crystal panel from the opposite sides by introducing a heated compressed air (warm air) into the jig 70 illustrated in FIG. 16. FIG. 18A is a view illustrating how the liquid crystal material flows at room temperature (about 20° C.) (i.e., the results when the warm air is not introduced). FIG. 18B is a view illustrating how the liquid crystal material flows when the temperature of the liquid crystal material and the liquid crystal panel 21 is increased to about 40° C. by using the jigs 70. While it takes about 29 minutes to complete the liquid crystal injection in the case of FIG. 18A, it takes about 13 minutes in the case of FIG. 18B, indicating that the injection time can be further reduced considerably by heating the jigs 70. This is due to the fact that the viscosity of the liquid crystal material is reduced by being heated and the fluidity thereof is thus enhanced.

As described above, with the method of the present example, the liquid crystal injection can be performed with the distortion of the liquid crystal panel being suppressed. Therefore, it is possible to increase the injection pressure of the liquid crystal material and thus to further reduce the amount of time required for the liquid crystal injection.

In the present example, the pressing force applied to the liquid crystal panel by the jigs is kept constant during the liquid crystal injection. However, it is also applicable to vary the pressing force over time. In this way, the distortion of the liquid crystal panel varying over time during the liquid crystal injection can be properly accommodated.

Example 4

Hereinafter, a liquid crystal injection apparatus according to the present example will be described. The components and structure that are the same as those in Examples 1 to 3 will not be further described below.

Figure 19:
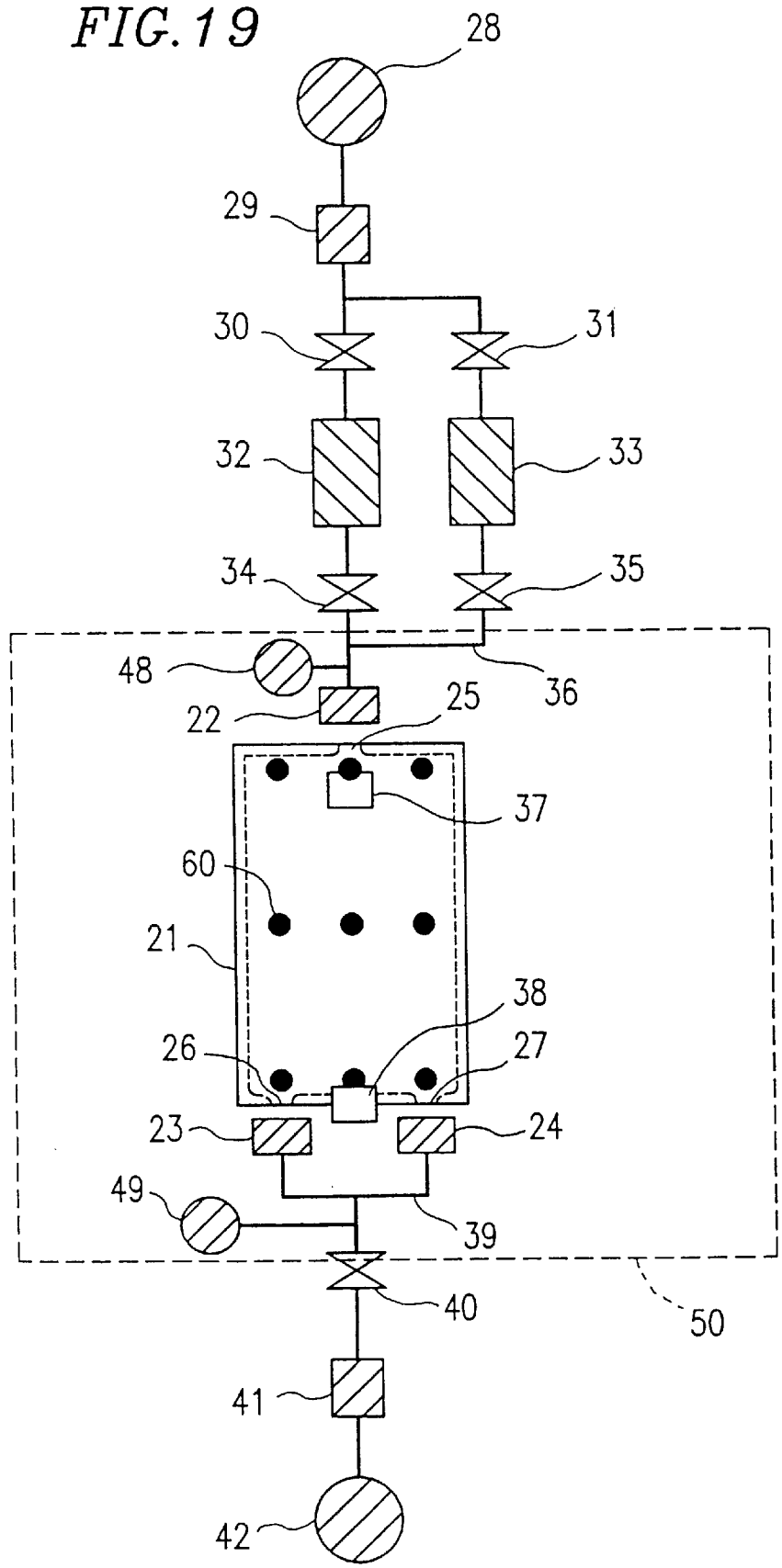
FIG. 19 is a schematic view illustrating a configuration of a liquid crystal injection apparatus according to Example 4.
Figure 20:
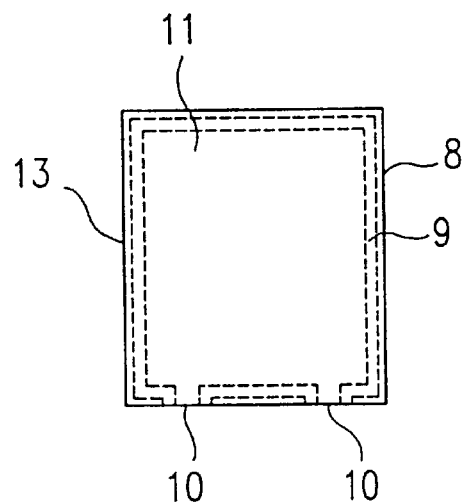
FIG. 20 is a view illustrating a configuration of a conventional liquid crystal panel.

FIG. 19 is a schematic view illustrating a configuration of the liquid crystal injection apparatus according to the present example. The difference from the liquid crystal injection apparatus illustrated in FIG. 2 is that transmission type optical sensors 60 are provided in a plurality of locations (nine locations in the present example) on the liquid crystal panel 21 for measuring the thickness at the respective locations.

The transmission type optical sensor 60 measures the thickness of the liquid crystal panel 21, as described above. Since the thickness of the liquid crystal panel 21 is related to the amount of liquid crystal material being filled therein, the amount of liquid crystal material being filled therein can be determined based on the measured thickness. Hereinafter, the method for injecting the liquid crystal material according to the present example will be described.

First, the liquid crystal material is filled into the liquid crystal panel 21 by using the method described in Examples 1 to 3. Then, the thickness of the liquid crystal panel 21 is measured by the transmission type optical sensor 60, and the appropriateness of the measured thickness is determined by a determination means (not shown). For example, the determination means compares the measurement result of the transmission type optical sensor 60 with a stored and predetermined thickness. Based on the determination, if the thickness is determined to be small, the injection of the liquid crystal material is continued. If the thickness is determined to be thick, the amount of liquid crystal material to be injected into the following liquid crystal panel 21 is reduced. It should be noted that the above-described ability of continuing the injection of the liquid crystal material when the liquid crystal material is insufficient is provided because the liquid crystal material is injected while being pressurized. This ability is unique to the present invention.

By providing control means with which the amount or time of the liquid crystal injection can be varied, the amount of liquid crystal material to be injected into the following liquid crystal panel 21 can be automatically increased/decreased based on the measurement results of the transmission type optical sensor 60, thereby improving the productivity of the liquid crystal display device.

Moreover, when the thickness of the liquid crystal panel 21 is measured while injecting the liquid crystal material into the liquid crystal panel 21 so that the amount or time of the liquid crystal injection is increased/decreased based on the measurement results, it is possible to fill an appropriate amount of liquid crystal material accurately in accordance with the variation of, e.g., the shape of the injection port 25 of the individual liquid crystal panel 21.

As described above, with the liquid crystal injection apparatus according to the present example, it is possible to perform the liquid crystal injection in accordance with the variations in the individual processes for mass production and the individual components. Therefore, the reliability of the liquid crystal panel after the liquid crystal material filling can be improved.

As described above, according to the present invention, the liquid crystal material is injected into the liquid crystal panel with the liquid crystal material being pressurized while the liquid crystal panel is evacuated. Therefore, by adjusting the evacuation force and the pressure, it is possible to inject the liquid crystal material uniformly into the entire liquid crystal panel even when the liquid crystal panel is a large liquid crystal panel.

Moreover, the present invention is efficient in that the filling of the liquid crystal material into the liquid crystal panel can be achieved with only the least necessary amount of liquid crystal material being injected.

Furthermore, there is no excessive liquid crystal material being exposed to a vacuum for a long time. Therefore, there is no deterioration in the liquid crystal material, thus resulting in high quality.

Still furthermore, a sufficient injection pressure is obtained by the pressure injection even when the liquid crystal material is injected into a considerably large liquid crystal panel. Thus, the amount of time required for the liquid crystal injection can be reduced.

Still furthermore, the evacuation of the liquid crystal panel and the liquid crystal injection into the liquid crystal panel can be performed through the injection and evacuation ports under atmospheric pressure without containing the liquid crystal panel itself in a vacuum chamber. Therefore, it is easy to prevent the liquid crystal cell from being damaged due to the depressurization and to improve the mass productivity.

Still furthermore, by pressing the liquid crystal panel in the thickness direction during the liquid crystal injection, the distortion of the liquid crystal panel and the displacement of the spacer beads can be suppressed, thereby enhancing the quality of the liquid crystal panel after it is filled with the liquid crystal material. This further allows for the injection pressure (pressure force) to be increased so that the amount of time required for the liquid crystal injection can be further reduced.

Still furthermore, by providing the means for measuring the thickness of the liquid crystal panel so that the amount and time of the liquid crystal injection can be varied based on the measurement results, it is possible to perform the liquid crystal injection in accordance with the variations in the individual processes and the individual components, thus improving the reliability of the liquid crystal panel after the liquid crystal material filling.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for injecting a liquid crystal material into a liquid crystal panel which is provided with a liquid crystal injection port and at least two evacuation ports, the method comprising the step of:

evacuating the liquid crystal panel; and injecting the liquid crystal material into the liquid crystal panel through the liquid crystal injection port with the liquid crystal material being pressurized while evacuating the liquid crystal panel, wherein:

the liquid crystal injection port is formed substantially in the middle of a first side of the liquid crystal panel; and the evacuation ports are formed near each of opposite corners of a second side of the liquid crystal panel which opposes the first side, an optical sensor is provided substantially in the middle between the evacuation ports.

2. An apparatus for injecting a liquid crystal material into a liquid crystal panel which is provided with a liquid crystal injection port and at least two evacuation ports, wherein:

the liquid crystal injection port is formed substantially in the middle of a first side of the liquid crystal panel; and the evacuation ports are formed near each of opposite corners of a second side of the liquid crystal panel which opposes the first side, an optical sensor is provided substantially in the middle between the evacuation ports; the apparatus comprising:

first evacuation means for evacuating the liquid crystal panel through the evacuation ports; and pressure injection means for injecting the liquid crystal material into the liquid crystal panel through the liquid crystal injection port with the liquid crystal material being pressurized.

3. An apparatus according to claim 2, wherein the pressure injection means includes storage means for storing the liquid crystal material, and collapsing means for collapsing the storage means so as to pressurize the liquid crystal material.

4. An apparatus according to claim 3, wherein the apparatus comprises:

at least two storage means; and second evacuation means for evacuating the store means.

5. An apparatus according to claim 2, further comprising control means for adjusting at least one of an evacuation pressure from the first evacuation means and a pressure from the pressure injection means so that the liquid crystal material is uniformly spread after being injected.

6. An apparatus according to claim 5, wherein the control means adjusts at least one of an evacuation pressure from the first evacuation means and a pressure from the pressure injection means so as to keep an injection rate at which the liquid crystal material is injected constant.

7. An apparatus according to claim 2, wherein the pressure injection means includes:

a liquid crystal material supply path in a contact zone where the pressure injection means contacts the liquid crystal injection port, with a diameter of the liquid crystal material supply path being larger than a diameter of the liquid crystal injection port; and an evacuation path in a contact zone where the pressure injection means contacts the evacuation port, with a diameter of the evacuation path being larger than a diameter of the evacuation port.

8. An apparatus according to claim 2, further comprising heating means for heating and holding at least the liquid crystal panel while the liquid crystal material is injected into the liquid crystal panel.

9. An apparatus according to claim 2, further comprising pressing means for pressing the liquid crystal panel in its thickness direction while the liquid crystal material is injected into the liquid crystal panel.

10. An apparatus according to claim 9, wherein the pressing means includes heating means for heating the liquid crystal panel.

11. An apparatus according to claim 2, further comprising:

thickness measuring means for measuring a thickness of the liquid crystal panel at least at one location on the liquid crystal panel; and adjusting means for adjusting at least one of an evacuation pressure from the first evacuation means and a pressure from the pressure injection means based on a measurement result of the thickness of the liquid crystal panel so as to vary an amount of liquid crystal material to be introduced into the liquid crystal panel.

12. An apparatus for injecting a liquid crystal material into a liquid crystal panel which is provided with a liquid crystal injection port and at least two evacuation ports, wherein:

the liquid crystal injection port is formed substantially in the middle of a first side of the liquid crystal panel; and the evacuation ports are formed near each of opposite corners of a second side of the liquid crystal panel which opposes the first side;

the apparatus comprising:

first evacuation means for evacuating the liquid crystal panel through the evacuation ports, pressure injection means for injecting the liquid crystal material into the liquid crystal panel through the liquid crystal injection port with the liquid crystal material being pressurized; and a pressing means for pressing the liquid crystal panel in its thickness direction while the liquid crystal material is injected into the liquid crystal panel; and wherein the pressing means is formed of an elastic member which expands and thus presses the liquid crystal panel when a compressed gas is introduced into the elastic member.

* * * * *